US012612729B2

(12) United States Patent
Ye et al.

(10) Patent No.: US 12,612,729 B2
(45) Date of Patent: Apr. 28, 2026

(54) IRONING MODULE INCLUDING STEAM IRON AND LAUNDRY TREATING APPARATUS INCLUDING THE SAME

(71) Applicant: LG Electronics Inc., Seoul (KR)

(72) Inventors: Sungmin Ye, Seoul (KR); Sungho Song, Seoul (KR); Jaemyoung Lee, Seoul (KR); Bokyong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/808,755

(22) Filed: Aug. 19, 2024

(65) Prior Publication Data

US 2025/0059701 A1 Feb. 20, 2025

(30) Foreign Application Priority Data

Aug. 18, 2023 (KR) ........................ 10-2023-0108205
Aug. 31, 2023 (KR) ........................ 10-2023-0115471

(51) Int. Cl.
*D06F 75/30* (2006.01)
*D06F 75/06* (2006.01)
*F16K 17/00* (2006.01)
*F22B 1/28* (2006.01)

(52) U.S. Cl.
CPC .............. *D06F 75/30* (2013.01); *D06F 75/06* (2013.01); *F16K 17/003* (2013.01); *F22B 1/285* (2013.01)

(58) Field of Classification Search
CPC .......... D06F 75/06; D06F 75/26; D06F 75/30; F16K 17/003; F22B 1/285
See application file for complete search history.

(56) References Cited

U.S. PATENT DOCUMENTS

| | | | | | |
|---|---|---|---|---|---|
| 6,067,403 | A | * | 5/2000 | Morgandi ............... | F22B 1/285 392/401 |
| 8,365,446 | B2 | | 2/2013 | Ng et al. | |
| 2010/0223820 | A1 | * | 9/2010 | Chadha ................... | D06F 75/12 38/77.8 |
| 2011/0209364 | A1 | | 9/2011 | Ng et al. | |

FOREIGN PATENT DOCUMENTS

| | | | | | |
|---|---|---|---|---|---|
| EP | | 0438112 | A2 | * | 7/1991 ............. D06F 75/12 |
| JP | | 6461109 | B2 | | 1/2019 |
| KR | 10-2003-0001583 | A | | | 1/2003 |
| KR | | 10-1425557 | B1 | | 8/2014 |
| KR | 10-2016-0066224 | A | | | 6/2016 |
| KR | | 10-1621697 | B1 | | 6/2016 |

OTHER PUBLICATIONS

International Search Report and Written Opinion in International Appln. No. PCT/KR2024/012257, mailed on Nov. 22, 2024, 9 pages.
Office Action in Korean Appln. No. 10-2023-0115471, mailed on Jan. 15, 2026, 15 pages (with English translation).

* cited by examiner

*Primary Examiner* — Nathan E Durham
(74) *Attorney, Agent, or Firm* — Fish & Richardson P.C.

(57) ABSTRACT

The present disclosure relates to an ironing module including a water supply tank that stores water therein, a steam generator that receives water from the water supply tank and heats water, a cable that transmits at least one of water and steam heated by the steam generator, and a steam iron connected to a distal end of the cable to spray steam to the outside, wherein the ironing module adjusts a spray amount of steam selectively using pressure and temperature conditions.

11 Claims, 24 Drawing Sheets

IRONING MODULE INCLUDING STEAM IRON AND LAUNDRY TREATING APPARATUS INCLUDING THE SAME

CROSS-REFERENCE TO RELATED APPLICATIONS

This application claims the benefit of Korean Patent Application No. 10-2023-0108205, filed on Aug. 18, 2023, and 10-2023-0115471, filed on Aug. 31, 2023. The disclosures of the prior applications are incorporated by reference in their entirety.

TECHNICAL FIELD

The present disclosure relates to an ironing module including a steam iron that may spray steam onto laundry, and a laundry treating apparatus including the same.

BACKGROUND

In general, an ironing module including a steam iron is different from a general iron in that a steam generator that generates steam and the steam iron that discharges steam are disposed to be spaced apart from each other and connected to each other via a cable.

Because such steam iron is disposed to be separated from the steam generator, there is an advantage of being lighter than the general iron in which the steam generator and a heating plate are integrated. Further, because such steam iron is able to spray steam while freely moving in three-dimensional directions within a range allowed by the cable without being restricted by an installation location of the steam generator, there is an effect of removing wrinkles even when laundry is hung on a clothes hanger or the like.

Therefore, various ironing modules in which the steam iron that sprays steam and the steam generator that generates steam are disposed to be separated from each other have recently appeared (see US Patent Application Publication No. 2008/0040953).

However, such ironing modules are constructed to sense a state of steam using only one of a temperature and a pressure of the steam generator and then spray steam. Therefore, the existing ironing modules are not able to adjust an amount of steam because the state of steam sprayed from the steam iron is uniform.

In addition, when the existing ironing modules are constructed to spray high-pressure steam using a pressure switch, it is structurally impossible to spray steam with various pressures. In other words, when the existing ironing modules use a plurality of pressure switches, it is impossible to design them as the ironing modules because a plurality of spray exits should be disposed and should be controlled one by one with valves, and also because cables in communication with the plurality of spray exits should be disposed.

In addition, when the existing ironing modules are constructed to spray steam with various pressures via a pressure sensor, it is difficult to precisely control a pressure of steam that is higher than an atmospheric pressure, making it difficult to uniformly spray steam to the steam iron.

In addition, when the existing ironing modules sense the temperature of steam and adjust the amount of steam using the temperature, a temperature deviation of a heater, which heats steam instead of water at a temperature and a pressure equal to or higher than certain temperature and pressure, becomes very great, making it impossible to adjust the amount of steam.

As a result, the existing ironing modules are not able to provide a method to discharge steam by precisely adjusting a spray amount thereof in two or more stages in a selective manner.

Therefore, the existing ironing modules have difficulty when applied to laundry with fabrics such as silk and cashmere that require precise control of the temperature and the spray amount of steam for wrinkle removal or deodorization using the steam iron, and there is a problem in that sufficient steam is not supplied to laundry with a great thickness such as jeans and coats.

SUMMARY

The present disclosure is to provide an ironing module that may adjust an amount of steam sprayed from a steam iron.

The present disclosure is to provide an ironing module that may control and select an amount of steam sprayed from a steam iron with temperature and pressure conditions.

The present disclosure is to provide an ironing module that may precisely adjust a spray amount of steam sprayed from a steam iron in two or more specific ranges.

The present disclosure is to provide an ironing module that may set and control a spray amount of steam sprayed from a steam iron according to an accurate specification.

To solve the above-mentioned problems, the present disclosure provides an ironing module including a water supply tank that stores water therein, a steam generator that receives water from the water supply tank and heats water, a temperature sensor that senses a temperature of the steam generator, a pressure sensor that senses a pressure of the steam generator, a cable that discharges steam heated by the steam generator, a steam iron connected to a distal end of the cable to spray steam to the outside, and a valve that is coupled to the steam generator and determines whether to supply steam to the cable.

The valve is controlled to open when the temperature of the steam generator reaches a set temperature until the temperature of the steam generator reaches a reference temperature, and open when a pressure of the steam generator reaches a specific pressure.

The ironing module may set a spray amount of steam to be equal to or smaller than 65 cc per minute until the temperature of the steam generator reaches the reference temperature, and set the spray amount of steam to be in a range of 65 cc to 85 cc per minute when the pressure of the steam generator reaches the specific pressure.

The specific pressure may be set to 4 bar.

The valve may be controlled to open each time when the temperature of the steam generator reaches an initial temperature lower than the reference temperature and an intermediate temperature higher than the initial temperature and lower than the reference temperature.

The initial temperature may be set to be in a range of 130 to 135 degrees Celsius, and the intermediate temperature may be set to be in a range of 135 to 140 degrees Celsius.

The spray amount of steam may be set to be in a range of 35 cc to 55 cc per minute when the temperature of the steam generator reaches the initial temperature, and may be set to be in a range of 45 cc to 65 cc per minute when the temperature of the steam generator reaches the intermediate temperature.

The spray amount of steam may be set based on a standard steam amount measurement method (1EC60311).

The spray amount of steam may be measured as a spray amount discharged when the valve repeats a process of opening for 5 seconds and closing for 15 seconds 12 times.

To solve the above-mentioned problems, the present disclosure provides an ironing module including a water supply tank that stores water therein, a steam generator that receives water from the water supply tank and heats water, a temperature sensor that senses a temperature of the steam generator, a pressure sensor that senses a pressure of the steam generator, a cable that discharges steam heated by the steam generator, a steam iron connected to a distal end of the cable to spray steam to the outside, and a valve that is coupled to the steam generator and determines whether to supply steam to the cable.

The valve is controlled to open when the temperature of the steam generator reaches a set temperature until the temperature of the steam generator reaches a reference temperature, and open when a pressure of the steam generator reaches a specific pressure after the reference temperature.

The ironing module may further include a heater coupled to an outer side of the steam generator to heat the steam generator and generate steam.

The valve may be controlled to open only when the specific pressure is reached at a temperature equal to or higher than the reference temperature.

The pressure sensor may be constructed as a pressure switch that senses whether the pressure inside the steam generator reaches the specific pressure.

The single pressure sensor may be disposed.

The valve may be controlled to open when the temperature of the steam generator reaches an initial temperature, and open each time the temperature of the steam generator reaches at least one intermediate temperature higher than the initial temperature and lower than the reference temperature.

The heater may be controlled in a minimum mode of heating the steam generator until the temperature thereof reaches the initial temperature and maintaining the initial temperature, and a maximum mode of heating the steam generator until the pressure thereof reaches the specific pressure and maintaining the specific pressure.

The heater may further include at least one intermediate mode of heating the steam generator until the temperature thereof reaches one of the at least one intermediate temperature and maintaining the corresponding temperature.

A spray amount of steam supplied from the steam generator to the cable may be set to be greater in the at least one intermediate mode than in the minimum mode, and may be set to be greater in the maximum mode than in the at least one intermediate mode.

To solve the above-mentioned problems, the present disclosure provides an ironing module including a water supply tank that stores water therein, a steam generator that receives water from the water supply tank and heats water, a cable that discharges steam heated by the steam generator, a steam iron connected to a distal end of the cable to spray steam to the outside, and a valve that is coupled to the steam generator and determines whether to supply steam to the cable.

The steam generator includes a steam body providing a storage space for storing water therein, a heater that heats the steam body or water, an entrance disposed on the steam body to guide water to the storage space, an exit extended from the steam body to discharge steam to the cable, a valve that is coupled to the exit and adjusts opening and closing of the exit, a temperature sensor that senses a temperature of the steam body or the storage space, and a pressure sensor that senses a pressure of the storage space or the exit.

The valve is controlled to open the exit when the pressure reaches a specific pressure, and open the exit when a set temperature is reached even before the pressure reaches the specific pressure.

The pressure sensor may sense only whether the pressure of the storage space or the exit has reached the specific pressure.

The present disclosure may adjust the amount of steam sprayed from the steam iron.

The present disclosure may control and select the amount of steam sprayed from the steam iron with the temperature and pressure conditions.

The present disclosure may precisely adjust the spray amount of steam sprayed from the steam iron in the two or more specific ranges.

The present disclosure may set and control the spray amount of steam sprayed from the steam iron according to the accurate specification.

DETAILED DESCRIPTION

Figure 1:
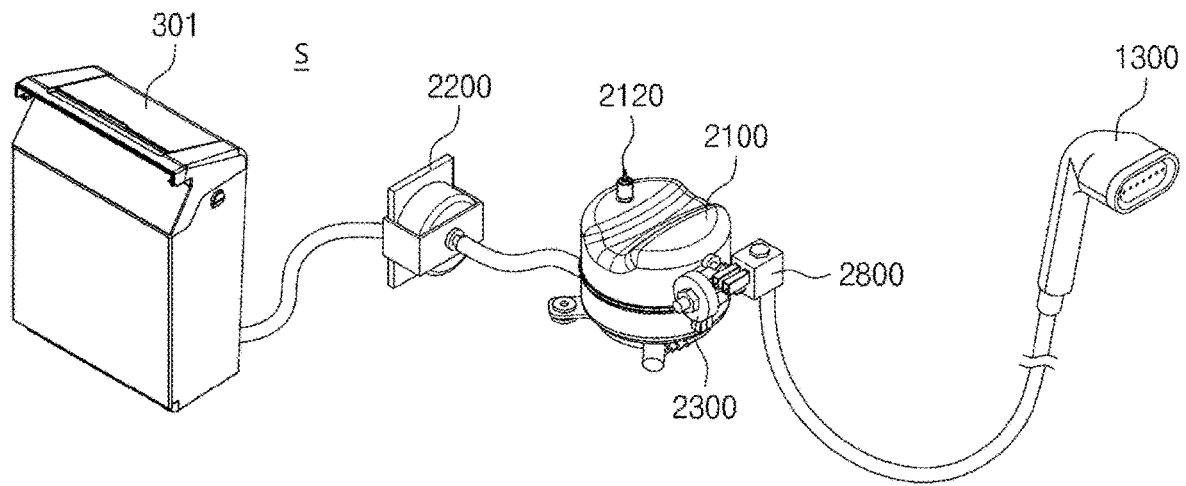
FIG. 1 shows an ironing module S of the present disclosure.

Hereinafter, embodiments disclosed herein will be described in detail with reference to the attached drawings. In the present document, identical or similar components are assigned identical or similar reference numerals even in different embodiments, and descriptions thereof are replaced with the first description. A singular expression used herein includes a plural expression unless the context clearly indicates otherwise. In addition, when describing the embodiments disclosed herein, when it is determined that a detailed description of a related known technology may obscure the gist of the embodiments disclosed herein, the detailed description thereof will be omitted. In addition, it should be noted that the attached drawings are only intended to facilitate easy understanding of the embodiments disclosed herein, and the technical ideas disclosed herein should not be construed as being limited by the attached drawings. In the present document, an X-axis means a front and rear direction of a laundry treating apparatus, a Y-axis means a width direction of the laundry treating apparatus, and a Z-axis means a height direction of the laundry treating apparatus.

FIG. 1 shows an ironing module S of the present disclosure.

The ironing module S of the present disclosure may include a steam generator 2100 that receives water and heats water into steam, a cable 1400 that receives and transmits steam generated in the steam generator 2100, and a steam iron 1300 that is coupled to the cable 1400 and sprays steam onto laundry or the like.

The ironing module S of the present disclosure may further include a water supply tank 301 that stores water that is to be supplied to the steam generator 2100, and a water supply pipe that connects the water supply tank 301 with the steam generator 2100.

The cable 1400 may transmit at least one of steam and water to the steam iron 1300, and may also include a built-in control line or the like that is in communication with the steam iron 1300 or supplies power to the steam iron 1300.

The ironing module S of the present disclosure may be constructed as an independent apparatus. In this case, the ironing module S may be portable.

In one example, the ironing module S of the present disclosure may also be constructed as a part of an ironing system or a laundry treating apparatus, such as a laundry manager.

In any case, the ironing module S of the present disclosure may be in any structure as long as it may heat water and spray steam to the laundry with the steam iron 1300.

The steam generator 2100 may be connected to the separate water supply tank 301 to receive water.

When the ironing module S of the present disclosure is equipped as the independent apparatus, the ironing module S of the present disclosure may further include the water supply tank 301, and a water supply structure 2500 that connects the water supply tank 301 with the steam generator 2100.

However, when the ironing module S of the present disclosure is equipped as the part of the laundry treating apparatus, the water supply tank 301 and the water supply structure 2500 of the corresponding laundry treating apparatus may be shared.

The water supply structure 2500 may compress water supplied from the water supply tank 301 at a high pressure and supply compressed water to the steam generator 2100. Accordingly, even when the steam generator 2100 heats water at a pressure equal to or higher than 1 atm to generate steam, water may be continuously supplied into the steam generator 2100.

The steam iron 1300 may be divided into a portion that a user may grip and a portion that sprays steam supplied from the steam generator 2100 onto the laundry at a distal end.

The portion that the user may grip is heat-insulated with plastic to prevent the user from getting burned, and the portion where steam is sprayed is made of metal to effectively transfer heat to the laundry.

The steam iron 1300 may be equipped with a separate input unit that may adjust operation or stop of the steam generator 2100, an amount of steam generated from the steam generator 2100, a temperature of steam, and the like.

The ironing module S of the present disclosure may further include a drainage tank 302 that may recover water remaining unheated in the steam generator 2100, water condensed from steam, or water condensed in the cable 1400, and a drainage structure 2600 that connects the steam generator 2100 with the drainage tank 302.

When the ironing module S of the present disclosure is equipped as the part of the laundry treating apparatus or the like, the drainage structure 2600 and the drainage tank 302 may be shared with the laundry treating apparatus.

The steam generator 2100 may further include a steam body 2110 that provides a storage space for storing therein water received from the water supply tank 301, a heater 2130 that heats water in the steam body 2110 or the storage space, an entrance 2140 that supplies water to the steam body 2110, an exit 2150 that discharges at least one of water and steam heated in the steam body 2110, a temperature sensor 2120 that is coupled to the steam body 2110 and senses a temperature inside the storage space or the steam body 2110, and a steam valve 2310 that opens and closes the exit 2150.

Accordingly, the ironing module S of the present disclosure may induce steam of an intended temperature to be discharged from the steam generator 2100 via control of the steam valve 2310 and the heater 2130.

In addition, the steam generator 2100 may further include a pressure sensor 2300 that senses a pressure of the storage space or the exit 2150.

Accordingly, the ironing module S of the present disclosure may induce steam of an intended pressure to be discharged from the steam generator 2100.

As a result, the ironing module S of the present disclosure may control all of the temperature, the pressure, and a spray amount of steam transmitted to the cable 1400 via the temperature sensor 2120, the pressure sensor 2300, and an opening and closing timing of the steam valve 2310.

Figure 2:
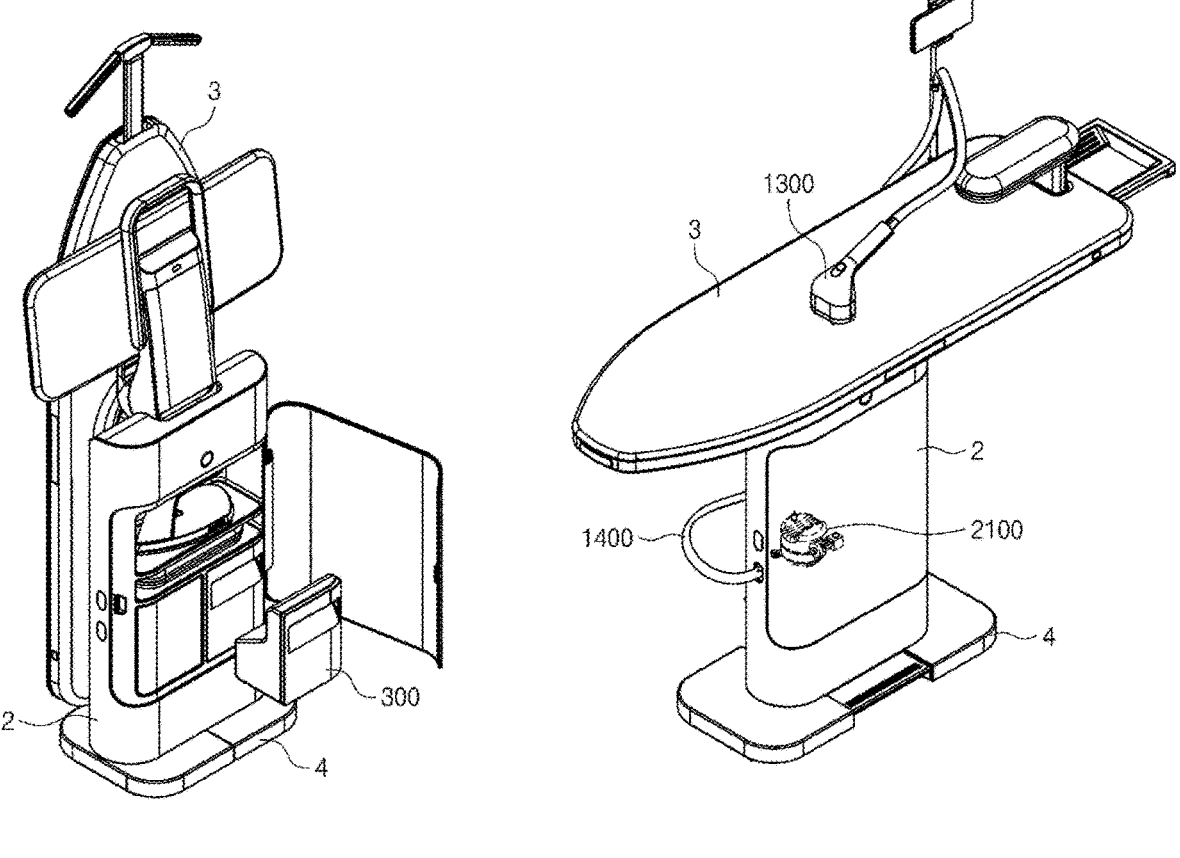
FIGS. 2A and 2B show an embodiment in which the ironing module S of the present disclosure is installed in an ironing system.

FIGS. 2A and 2B show an embodiment in which the ironing module S of the present disclosure is installed in an ironing system.

The ironing system of the present disclosure may include an ironing board 3 having a pressing surface on which the laundry may be pressed, a support column 2 connected to the ironing board to support the ironing board, and a ground contact portion 4 disposed beneath the support column 2 to secure the support column to the ground.

The ironing board 3 may have a width greater than a length. For example, the ironing board 3 may be formed in a shape such as a skateboard or a surfboard.

The ironing board 3 may be seated on an upper end of the support column 2, may be rotatable at the upper end of the support column 2, and may be rotatable upward or laterally relative to the support column 2 so as to be disposed on a side surface of the support column 2.

The laundry may be disposed on a top surface of the ironing board 3 and may be pressed by an iron.

The support column 2 may have a height greater than a width or a thickness.

The iron may be detachably disposed inside the support column 2.

In addition, the ironing module S may be installed inside the support column 2, and the steam iron 1300 may also be detachably disposed.

The steam generator 2100 may be fixedly installed inside the support column 2, and the water supply tank 301 may also be installed. The water supply tank 301 may also be detachably disposed, and the steam generator 2100 may supply steam not only to the steam iron 1300 but also to the iron.

The exit 2150 of the steam generator 2100 may be in communication with an inner surface of the support column 2, and the cable 1400 may have one end detachably coupled to the side surface of the support column 2 and the other end detachably coupled to the steam iron 1300.

Figure 3:
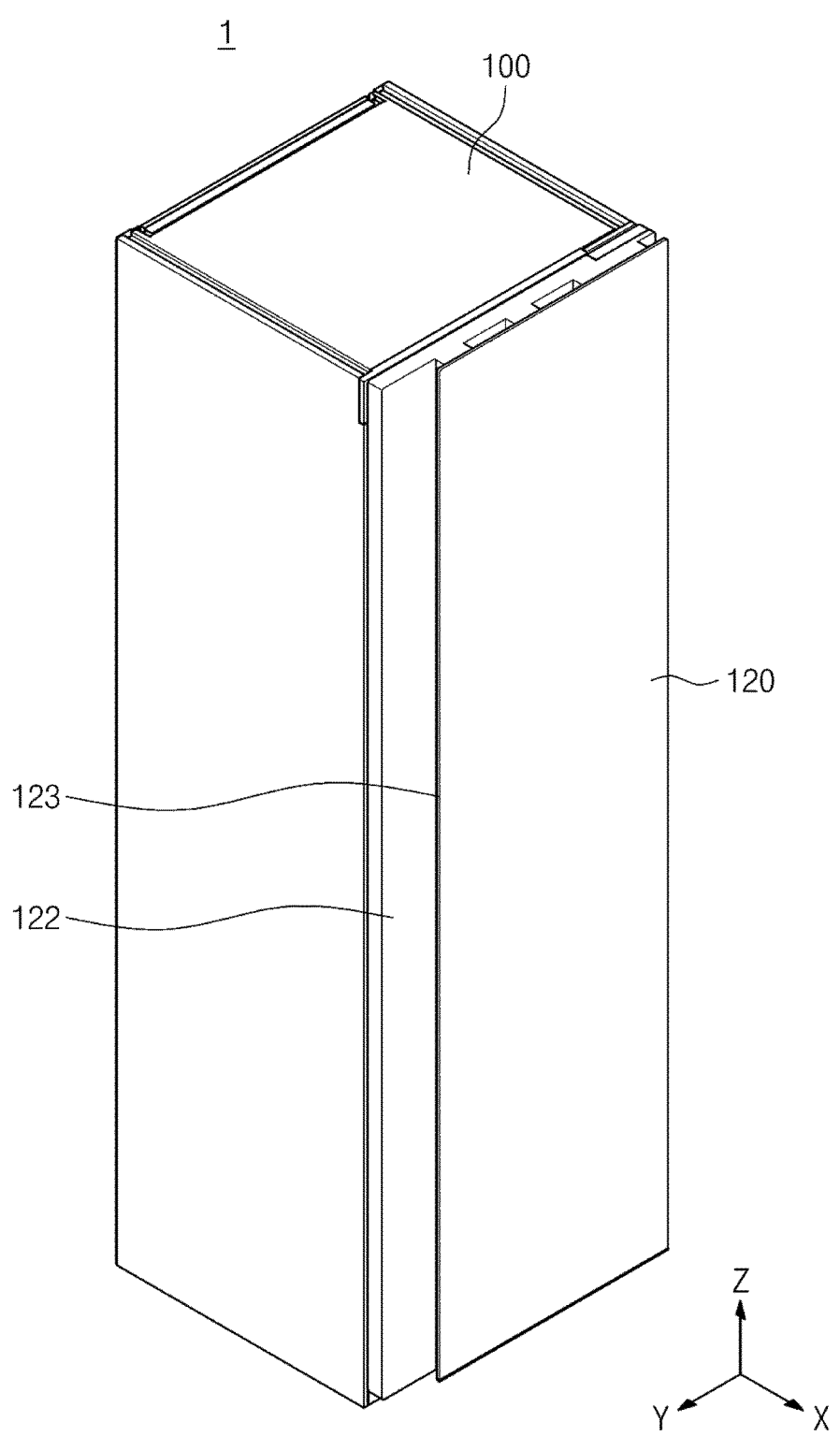
FIG. 3 shows an embodiment in which the ironing module S of the present disclosure is installed in a laundry treating apparatus equipped as a laundry manager.

FIG. 3 shows an embodiment in which the ironing module S of the present disclosure is installed in a laundry treating apparatus equipped as a laundry manager.

The ironing module S of the present disclosure may be installed in a machine room located inside a door or in a lower portion of the laundry treating apparatus.

Specifically, the laundry treating apparatus may include a cabinet 100 forming an outer appearance, and a door 120 pivotably coupled to the cabinet 100.

The door 120 may include a main body 121 forming a front surface of the cabinet 100, and an installation body 122 extending from one side of the main body 121 and where a display for displaying information of the laundry treating apparatus may be installed.

The cabinet 100 may be constructed such that a height is greater than a width in a left and right direction and a thickness in a front and rear direction. Accordingly, in the laundry treating apparatus, even long laundry may be hung inside the cabinet 100 without being folded.

The installation body 122 may be extended from the main body 121 while forming a step rearward of the cabinet 100.

The installation body 122 may be made of a material or may have a color different from that of the main body 121. In addition, the installation body 122 may be made of a translucent material through which light emitted from the display may be transmitted.

A handle 123 may be disposed in an area where the installation body 122 and the main body 121 are stepped.

The handle 123 may be disposed on one surface of the main body 121 to extend forward of the installation body 122 in parallel with the main body 121. As a result, the handle 123 may be disposed to at least partly overlap the installation body 122 in the front and rear direction, and may define a space that the user may grip.

The cabinet 100 and the door 120 may be made of a metal material.

Figure 4:
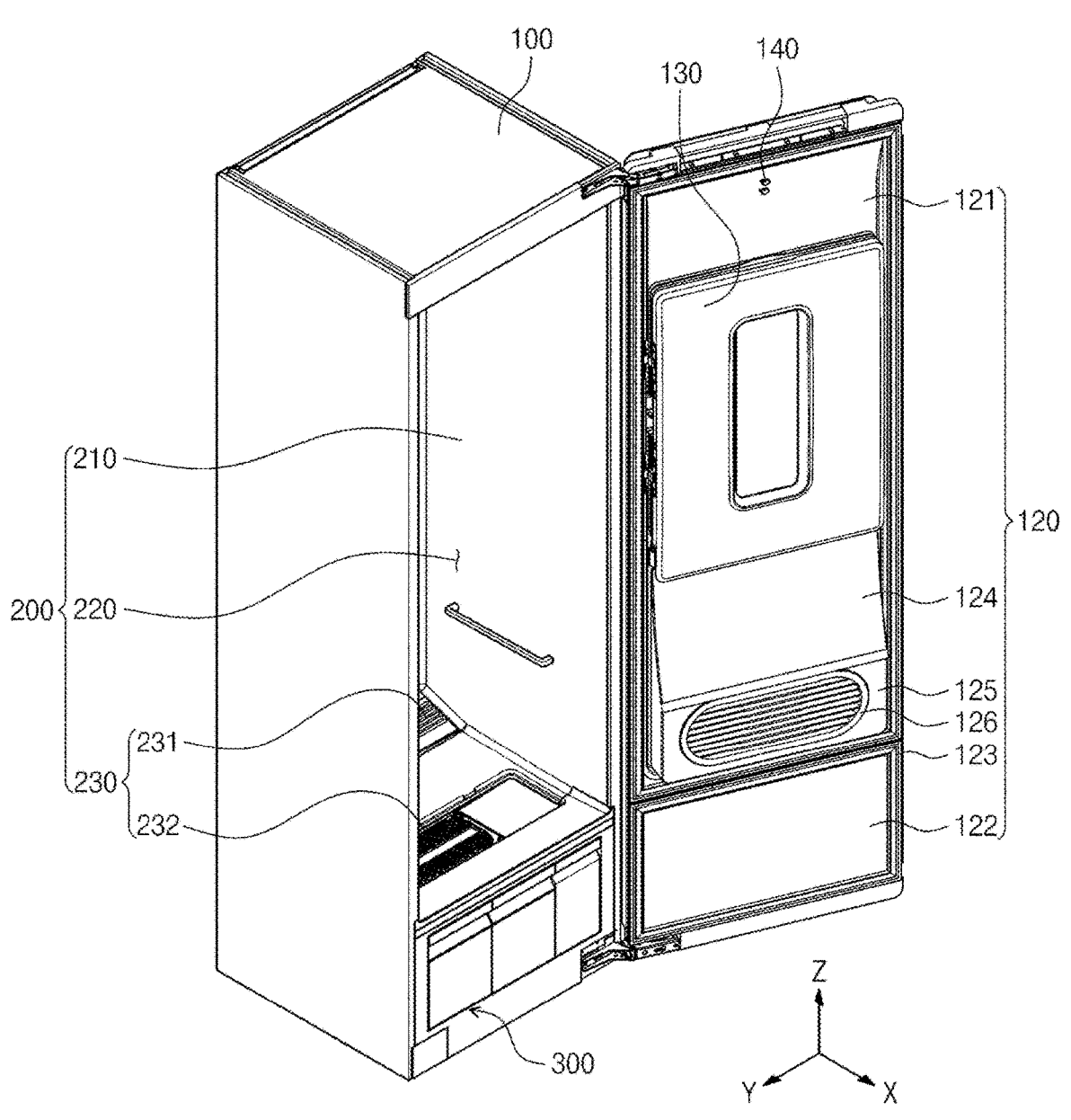
FIG. 4 shows interior of a cabinet of a laundry treating apparatus of the present disclosure.

FIG. 4 shows interior of a cabinet of a laundry treating apparatus of the present disclosure.

An inner casing 200 that has an accommodating space 220 for accommodating the laundry defined therein and defines an opening 210 in a front side through which the laundry is introduced may be disposed inside the cabinet 100.

The inner casing 200, which has a rectangular parallelepiped shape with an open front surface, may have a height smaller than that of the cabinet 100. As a result, an area in which a machine room 300 to be described below may be installed may be secured in the lower portion of the cabinet 100.

The inner casing 200 may have the height greater than a width and a thickness. As a result, the laundry may be hung inside the accommodating space 220 without being folded or wrinkled.

The inner casing 200 may be made of a plastic resin material, and may be made of a reinforced plastic resin material that does not deform even when exposed to air at a temperature higher than a room temperature or heated air (hereinafter, hot air) and steam or moisture.

A hanger where the laundry may be hung in the accommodating space 220 may be disposed in an upper portion of an inner surface of the inner casing 200. The hanger may be formed in a clothes hanger shape and may be fixed to a top surface of the inner casing 200. Because of the hanger, the laundry may be disposed in the unfolded state and in a state of being suspended in air within the accommodating space 220.

A plurality of the hangers may be disposed along a width direction of the inner casing 200. As a result, a plurality of laundry pieces may be hung, spaced apart from each other within the inner casing 200.

The hanger may be constructed as a moving hanger that reciprocates or rotates in a reciprocating manner in the width direction within the inner casing 200. The laundry treating apparatus of the present disclosure may shake the laundry inside the inner casing because of the hanger, and the laundry may be shaken inside the accommodating space 220, thereby removing foreign substances, dust, and the like, and also removing wrinkles formed on the laundry.

The laundry treating apparatus of the present disclosure may be equipped with the machine room 300 in which various apparatuses are installed, which supply high-temperature air and heated air (hereinafter, hot air) to the accommodating space 220, supply steam to the accommodating space 220, or purify or dehumidify outside air of the cabinet 100.

The machine room 300 may be disposed separately or partitioned from the inner casing 200, but may be in communication with the accommodating space 220.

The machine room 300 may be disposed under the inner casing 200. Accordingly, when hot air and steam having a low specific gravity are supplied to the inner casing 200, hot air and steam may naturally rise in the accommodating space 220 and be supplied to the hung laundry.

The inner casing 200 may be partitioned and separated from the machine room 300 via a bottom surface 230. However, a plurality of through-holes may be defined in the bottom surface 230 to be in communication with the machine room 300.

To this end, the inner casing 200 may have a plurality of through-holes 230 that extend through one surface thereof and are in communication with the machine room 300.

Via the through-holes 230, air in the accommodating space 220 may be supplied to the machine room 300 and at least one of hot air and steam generated in the machine room 300 may be supplied to the accommodating space 220.

The through-holes 230 may include an inflow hole 232 extending through the bottom surface 230 of the inner casing 200 and allowing air inside the inner casing 200 to be discharged or sucked into the machine room 300, and an exhaust hole 231 extending through the bottom surface of the inner casing 200 and allowing hot air generated in the machine room 300 to be discharged.

The exhaust hole 231 may be defined to be biased rearward in the bottom surface of the inner casing 200. In addition, the inflow hole 232 may be defined to be biased forward in the bottom surface of the inner casing 200. As a result, a separation spacing between the inflow hole 232 and the exhaust hole 231 may be secured on the bottom surface 230 of the inner casing 200, and hot air supplied from the exhaust hole 231 may be prevented from being directly discharged to the inflow hole 232.

The through-holes 230 may further include a steam hole 233 into which steam generated in a steam supply 800 to be described below is supplied. The steam hole 233 may be defined closer to the exhaust hole 231 than to the inflow hole 232. For example, the steam hole 233 may be defined on one side of the exhaust hole 231. As a result, steam discharged from the steam hole 233 may be prevented from flowing directly into the inflow hole 232.

The door 120 may be pivotably coupled to the cabinet 100.

A height of the door 120 may correspond to the height of the cabinet 100. As a result, the door 120 may open and close the opening 210, and may also shield the machine room 300.

When the door 120 is closed, the opening 210 and the machine room 300 may be prevented from being exposed forward.

The door 120 may include a door body 121 forming a main body and a sealing member 123 coupled to an inner surface of the door body 121 to seal the opening 210.

The sealing member 123 may be disposed in an area facing a periphery of the opening 210 on the inner surface of the door body 121 to seal the opening 210.

In one example, the door body 121 may include a protective panel 122 that shields the machine room 300 and protects the machine room 300 under the sealing member 123 that seals the opening 210.

The sealing member 123 may extend downward of the opening 210 to also seal a front periphery of the machine room 300.

The door 120 may include a protruding portion 125 that protrudes from the inner surface of the door body 121 such that at least a portion thereof may be inserted into the opening 210.

The protruding portion 125 may protrude from the door body 121 to an extent that it is disposed in front of the inflow hole 232 when the door 120 closes the opening 210.

The protruding portion 125 may have a width corresponding to a width of the opening 210. The protruding portion 125 may be disposed closer to a lower portion of the opening 210 or the bottom surface 230 of the inner casing 200 than to an upper end of the door body 121.

As a result, hot air and steam in the accommodating space 220 of the inner casing may be guided to be introduced into the inflow hole 232, and may be prevented from being discharged out of the opening 210 and being exposed to the machine room 300.

A height of the protruding portion 125 may be smaller than ⅓ of the height of the inner casing 200, and a thickness of the protruding portion 125 protruding from the door body 121 may be smaller than a spacing from a front edge of the bottom surface 230 to the inflow hole 232.

The door body 121 may further include a curved surface 124 extending toward the protruding portion 125 on the inner surface thereof. The curved surface 124 may be formed in a downwardly convex shape. The curved surface 124 may induce hot air and steam supplied to the accommodating space 220 to circulate inside the accommodating space 220.

The laundry treating apparatus of the present disclosure may include a pressurizer 130 that is pivotably coupled to the inner surface of the door body 121 to pressurize the laundry, and a fixer 140 that may hang the laundry at a vertical level higher than that of the pressurizer 130.

The pressurizer 130 may pivot in a width direction of the door 120 to pressurize the laundry hung on the fixer 140.

Accordingly, by pressing the laundry hung on the fixer 140 with the pressurizer 130, the wrinkles in the laundry may be removed, and intended creases may also be formed in the laundry.

The curved surface 124 may extend from a lower end of the pressurizer 130 to the protruding portion 125. Accordingly, when water condensed in the laundry hung on the fixer 140 flows along the pressurizer 130 or the inner surface of the door body 121, water may flow along the curved surface 124 and be guided to the bottom surface 230 and may be prevented from flowing to the opening 210 or the sealing member 123. As a result, the machine room 300 may be prevented from being contaminated with water, steam, hot air, the foreign substances, and the like.

The protruding portion 125 may have an exposed surface disposed parallel to a rear surface of the inner casing 200, and a bottom surface extending from a lower portion of the exposed surface may be disposed parallel to the bottom surface 230 of the inner casing.

The exposed surface of the protruding portion 125 may have a through-hole 126 that extends through the exposed surface to allow air to enter and exit, and may have a duct through which air may flow in a space defined by the protruding portion 125, the curved surface 124, and the door body 121.

The door body 121 may have a communication hole in communication with the duct in an area of the inner surface corresponding to the pressurizer 130.

Accordingly, hot air and steam flowing in the inner casing 200 may be introduced into the through-hole 126 and discharged via the communication hole to dry the laundry hung on the pressurizer 130 or circulate air inside the inner casing 200.

Figure 5:
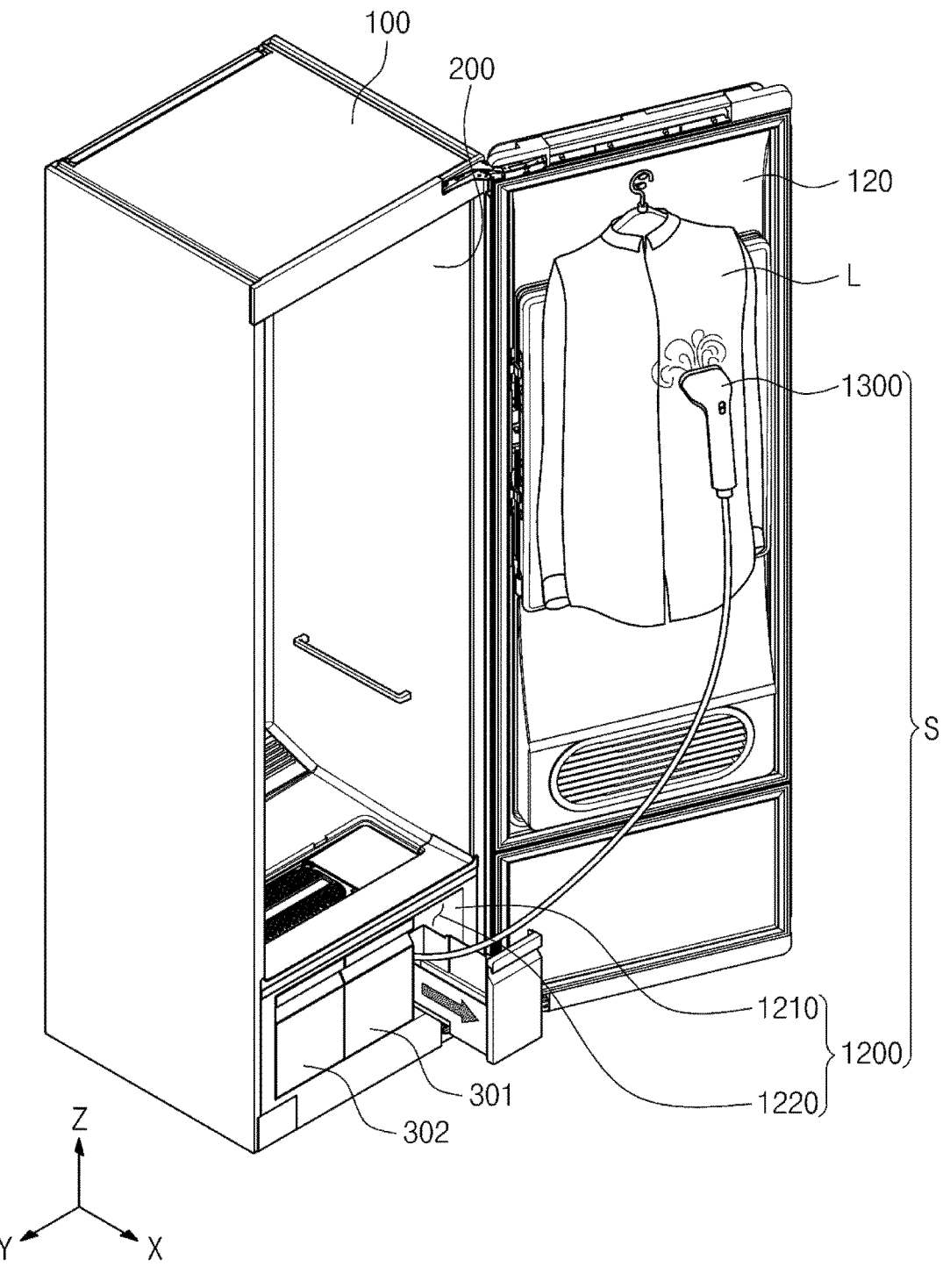
FIG. 5 shows an outer appearance of the machine room 300.

FIG. 5 shows an outer appearance of the machine room 300.

The machine room 300 supplies at least one of hot air and steam to the inner casing 200. To this end, the machine room 300 should be supplied with water necessary to generate steam and should collect steam supplied to the inner casing 200 or water condensed from the laundry.

To this end, the machine room 300 may include the water supply tank 301 that stores water to be used for steam, and the drainage tank 302 that collects water condensed inside the laundry treating apparatus.

The water supply tank 301 and the drainage tank 302 may be disposed in a front portion of the machine room 300. As a result, it may be easy to fill the water supply tank 301 with water or empty water in the drainage tank 302, and the laundry treating apparatus may be disposed without being limited by locations of a water source and a drain.

The ironing module S may be installed in the machine room.

The ironing module S may be equipped to supply heat and steam to a surface of the laundry.

The ironing module S may further include a storage box 1200 that stores the steam iron 1300 that may spray or supply at least one of heat and steam to the surface of the laundry inside the machine room 300.

The storage box 1200 may include a storage body 1210 that is mounted in the machine room 300 and provides a space in which the steam iron 1300 is stored, and an open surface 1220 defined in a front surface of the storage body 1210 and through which the steam iron 1300 is inserted and withdrawn.

The steam iron 1300 may be withdrawn from the machine room 300 while being withdrawn forward of the storage body 1210. The steam iron 1300 may reach the surface of the laundry hung on the fixer 140 or the hanger when withdrawn forward of the machine room 300.

The steam iron 1300 may transmit heat and steam to an upper end of the pressurizer 130 of the door 120, which is located upward of a midpoint in a height direction of the inner casing 200. The steam iron 1300 may be in contact with the surface of the laundry or may be disposed close to the laundry to directly spray heat and steam to the surface of the laundry.

For example, the steam iron 1300 may reach the hanger or the fixer 140. In addition, the steam iron 1300 may move to a top surface of the accommodating space 220 or an upper end of the inner surface of the door 120 when withdrawn from the storage box 1200.

The steam iron 1300 may supply heat to the surface of the laundry or may spray steam to the surface of the laundry. The steam iron 1300 may be equipped as a general steam iron or a general steamer. The steam iron 1300 may be equipped as any component as long as it satisfies a condition of removing the wrinkles that have occurred in the laundry.

Laundry L fixed to the hanger or the fixer 140 may be supported on the inner surface of the door 120 or an inner surface of the inner casing 200 and may be exposed to at least one of heat and steam supplied from the steam iron 1300. In this process, the laundry L may be refreshed or wrinkles thereof may be removed.

The ironing module S may be exposed to the front surface of the machine room 300, because the steam iron 1300 should be withdrawn from the machine room 300 to the laundry hung in the inner casing 200 or on the door 120.

For example, a front surface of the ironing module S may be disposed on one side of the water supply tank 301 or the drainage tank 302, and both side surfaces thereof may be disposed inside the machine room 300.

The water supply tank 301 and the drainage tank 302 may be shared by the ironing module S and a refreshing module T.

Figure 6:
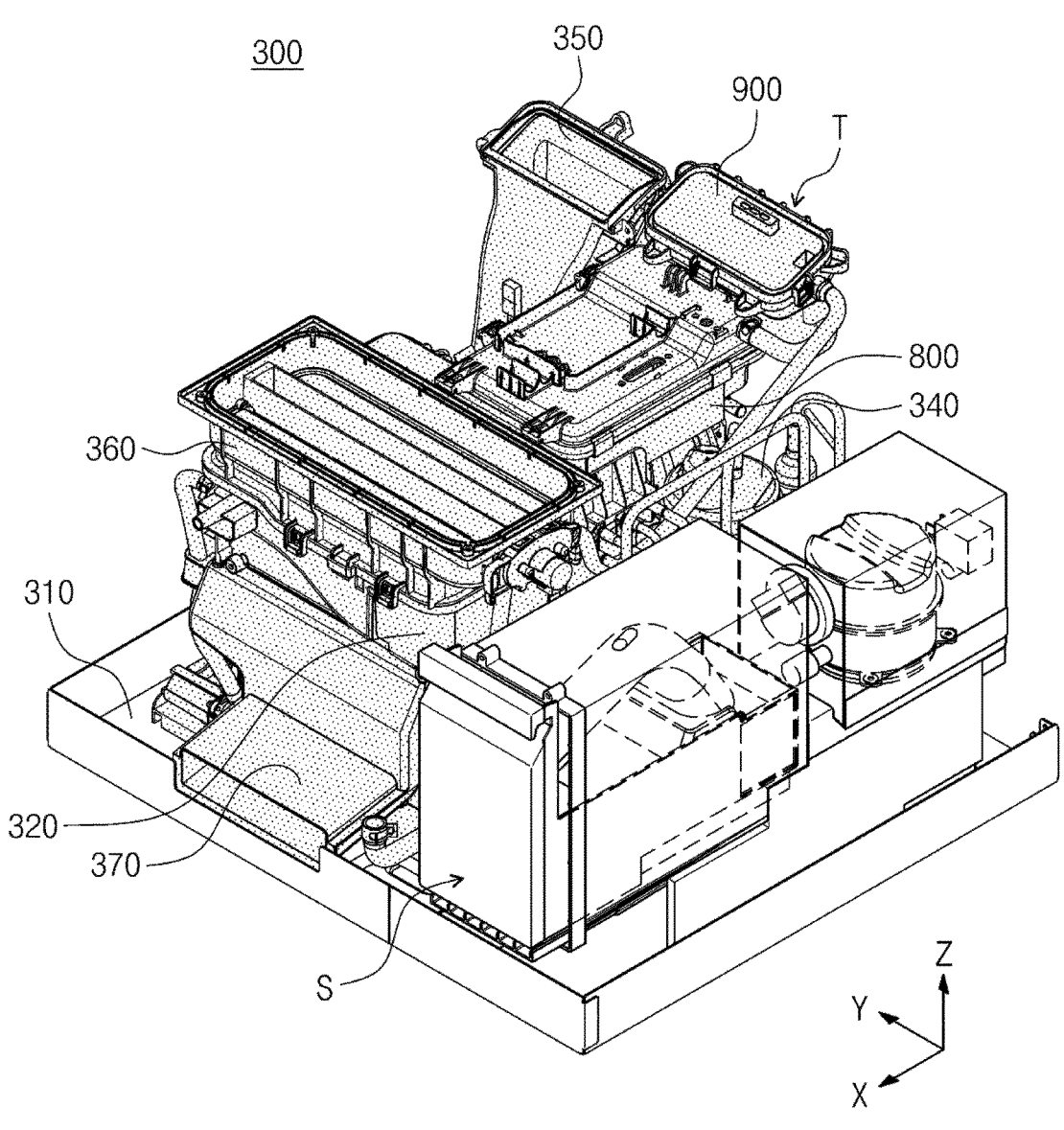
FIG. 6 shows a structure of a machine room of a laundry treating apparatus of a present disclosure.

FIG. 6 shows a structure of a machine room of a laundry treating apparatus of a present disclosure.

The machine room 300 may include therein the refreshing module T equipped as a component that may supply hot air and steam to the laundry hung in the accommodating space 220, circulate air inside the accommodating space, or circulate air outside the cabinet, and the ironing module S including the steam iron 1300.

The refreshing module T may include all apparatuses and components that may supply at least one of hot air and steam into the inner casing 200.

Specifically, the machine room 300 may include a base 310 on which a space where the various apparatuses described above may be supported or installed, a circulation duct 320 that is installed on or extended from the base 310 and provides a flow channel through which air inside the inner casing 200 or air outside the cabinet 100 flows, a blower 350 that is mounted on the circulation duct 320 and provides power to allow air to flow, a heat supply 340 that cools and heats air flowing along the circulation duct 320 to generate hot air, and the steam supply 800 that is supported on the base 310 or mounted on the circulation duct 320 and supplies steam into the inner casing 200.

The base 310 may be formed as a plate on which the various apparatuses are installed.

The circulation duct 320 may form a flow channel through which air introduced from the inner casing 200 or the outside of the cabinet 100 flows, and may be formed in a casing shape with an open top.

The heat supply 340 may include a heat exchanger disposed inside the circulation duct 320 to cool air, condense moisture, and reheat air, and a compressor disposed outside the circulation duct 320 to receive a refrigerant from the heat exchanger or supply the refrigerant.

The refreshing module may further include an outside air duct 370 that sucks outside air in front of the circulation duct 320 and guides sucked air into the circulation duct 320.

The circulation duct 320 may be in communication with the outside air duct 370 and selectively suck outside air.

The water supply tank and the drainage tank may also be included in the refreshing module T.

The water supply tank and the drainage tank may be detachably coupled to a front surface of the circulation duct 320. For example, the water supply tank 301 and the drainage tank 302 may be seated and disposed on the outdoor air duct 370.

The circulation duct 320 may be coupled to the base 310, but may be formed integrally with the base 310. For example, the base 310 and the circulation duct 320 may be simultaneously manufactured via injection molding.

The refreshing module T may include a base cover 360 disposed to be in communication with the circulation duct 320 and the inflow hole 232.

The base cover 360 may be coupled to an upper portion of the circulation duct 320 to guide air sucked in the inflow hole 232 into the circulation duct 320.

The base cover 360 may block air inside the circulation duct 320 from being discharged to the outside by shielding a top surface of the circulation duct 320. A lower portion of the base cover 360 and the top surface of the circulation duct 320 may form one surface of a flow channel of the circulation duct 320.

The base cover 360 may include an inlet 362 that allows the inflow hole 232 and the circulation duct 320 to be in communication with each other therein. The inlet 362 may be formed in a duct shape to serve as an intake duct that delivers air inside the inner casing 200 to the circulation duct 320.

The steam supply 800 may be connected to the water supply tank 301 and receive water to generate steam. The steam supply 800 may be seated and disposed on the circulation duct 320. The steam supply 800 may be disposed at the rear of the base cover 360.

The refreshing module T may further include a steam nozzle 900 that receives steam from the steam supply 800 and supplies steam into the inner casing 200. The steam nozzle 900 may be disposed between the steam supply 800 and the steam hole 233.

Water that has not been discharged from the steam nozzle 900 to the steam hole 233 but condensed may be recovered again to the steam supply 800.

The blower 350 may allow the circulation duct 320 and the exhaust hole 231 to be in communication with each other.

The ironing module S may be disposed on a left or right side of the refreshing module T inside the machine room 300. Specifically, the ironing module S may be disposed outside the circulation duct 320. Thus, the ironing module S may not obstruct a flow of air through the circulation duct 320.

The ironing module S may be disposed at one side of the base 310 to be parallel thereto along a length direction of the circulation duct 320.

Figure 7:
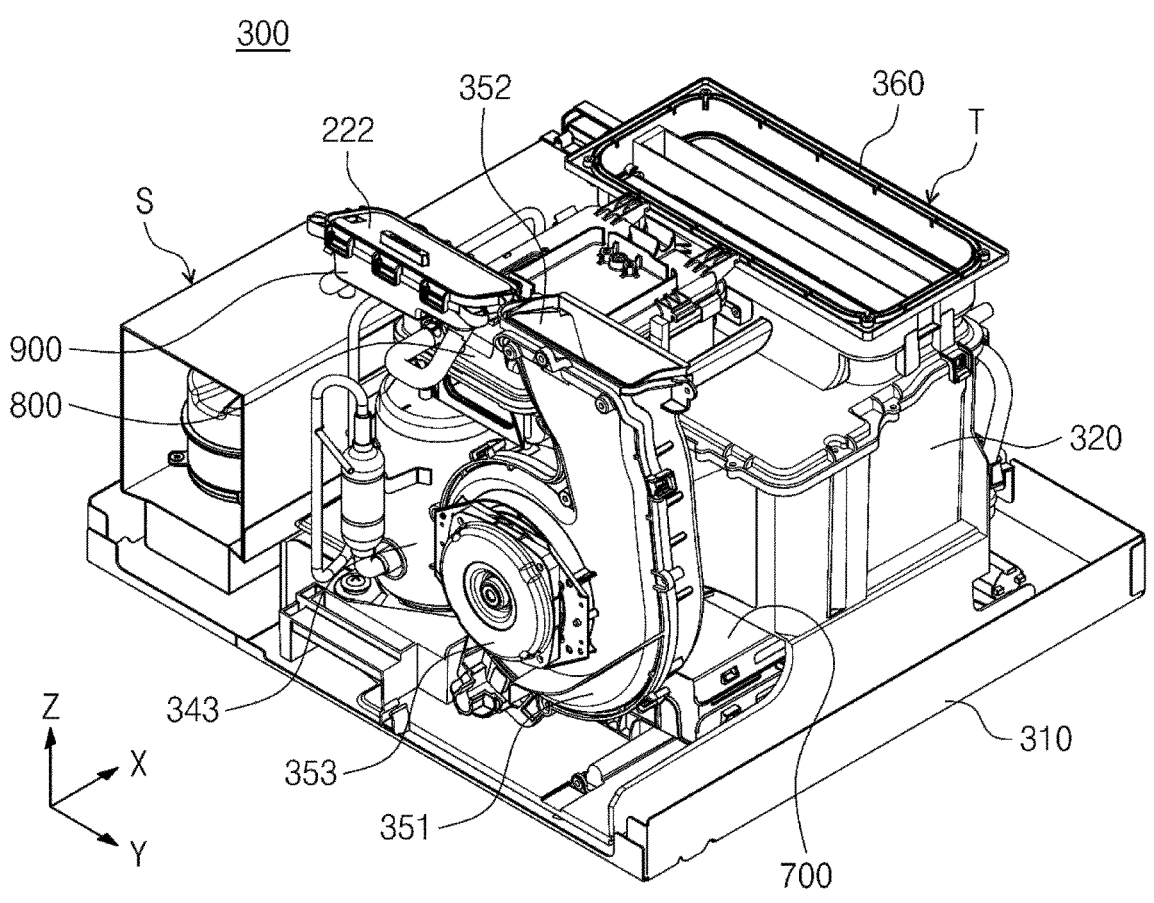
FIG. 7 is a rear view of the machine room.

FIG. 7 is a rear view of the machine room.

The blower 350 may include a blower fan 353 that provides power for air inside the circulation duct 320 to flow in one direction, and a fan housing 351 that accommodates the blower fan 353 therein and is coupled to or extended from the circulation duct 320.

The blower 350 may include an exhaust duct 352 that allows the circulation duct 320 and the exhaust hole 231 to be in communication with each other.

The exhaust duct 352 may be formed with a cross-section extending from the fan housing 351 toward exhaust hole 231 in an area size corresponding to that of exhaust hole 231.

As a result, air inside the inner casing 200 may be introduced via the base cover 360, pass through the circulation duct 320, and then be supplied back into the inner casing 200 via a fan installation portion 350.

The heat supply 340 may include a compressor 343 installed on the base 310 to exchange heat with air flowing through the circulation duct 320. The compressor 343 may be disposed on a left or right side of the circulation duct 320, and may be disposed between the circulation duct 320 and the ironing module S.

Figure 8:
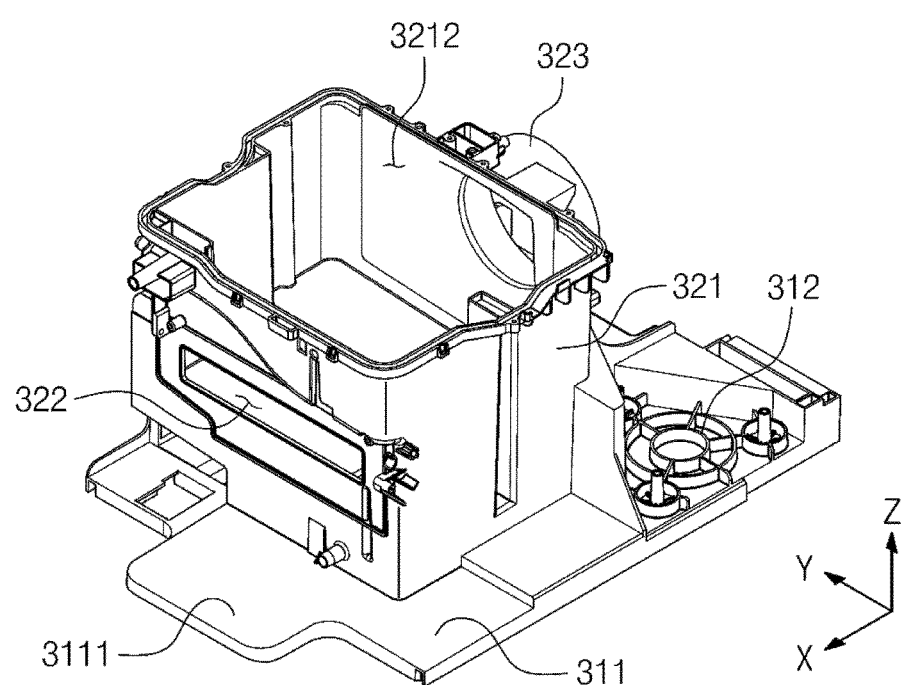
FIG. 8 shows structures of a circulation duct and a base in a machine room of a laundry treating apparatus of the present disclosure.

FIG. 8 shows structures of a circulation duct and a base in a machine room of a laundry treating apparatus of the present disclosure.

The base 310 may form a bottom surface of the laundry treating apparatus.

The base 310 may include a base bottom 311 forming a support surface. The base bottom 311 may form the bottom surface of the laundry treating apparatus.

In one example, the base bottom 311 may be seated on a top surface of the bottom surface of the cabinet 100 separately disposed to form the bottom surface of the laundry treating apparatus.

The base 310 may be integrally formed with the circulation duct 320 that forms at least a portion of the flow channel through which air flows. The circulation duct 320 may be formed by extending upward from the base bottom 311.

The circulation duct 320 may include a duct body 321 that extends from the base bottom 311 to form the flow channel, a heat exchanger installation portion 3212 that provides a space in which an evaporator 341 or a condenser 342 is installed inside the duct body 321, and an air discharger 323 that is disposed at the rear of the duct body 321 and discharges air in the duct body 321 to the blower 350.

The air discharger 323 may be formed in a pipe shape that extends rearward from the duct body 321. A diameter of the air discharger 323 may be smaller than a width of the duct body 321.

The air discharger 323 may be connected to the blower 350. Air discharged from the air discharger 323 may be guided into the inner casing 200 via the blower 350.

The circulation duct 320 may further include an outside air intake portion 322 defined by extending through a front surface of the duct body 321. The outside air intake portion 322 may be in communication with the outside air duct 370. The outside air duct 370 may be seated and supported in front of the outside air intake portion 322.

The circulation duct 320 may be installed with a damper that opens and closes the outside air intake portion 322. Opening and closing of the damper may allow or block inflow of outside air into the circulation duct 320.

The base 310 may include a compressor installation portion 312 that provides a space in which the compressor 343 is installed. The compressor installation portion 312 may be formed at one side of the base bottom 311 and may be formed integrally with the base bottom 311.

The compressor installation portion 312 may also have a protrusion formed that may support the compressor 343. The compressor installation portion 312 may be disposed to be biased to a rear side of the base 310. The compressor installation portion 312 may be disposed to at least partially overlap the air discharger 323 in a width direction.

A buffer member that reduces vibration transmitted from the compressor 343 may be installed in the compressor installation portion 312. The buffer member may be fixed to the protrusion.

The base 310 may include a compressor installation portion 312 in which the compressor 343, which supplies the refrigerant to the heat exchanger 341 and 343, is installed. The compressor installation portion 312 may be disposed outside the circulation duct 320.

The ironing module S may be seated on the compressor installation portion 312 or at one side of the base 310. The ironing module S may also be seated on the base 310. For example, the base bottom 311 may extend from the circulation duct 320 to edges of both side surfaces of the machine room 300, and the ironing module S may be seated on the base bottom 311.

In addition, the ironing module S may be installed in the machine room 300 by being disposed outside the base bottom 311. That is, the base bottom 311 may have a smaller area size than the bottom surface of the machine room 300, and the ironing module S may form a remaining bottom surface of the machine room 300.

Figure 9:
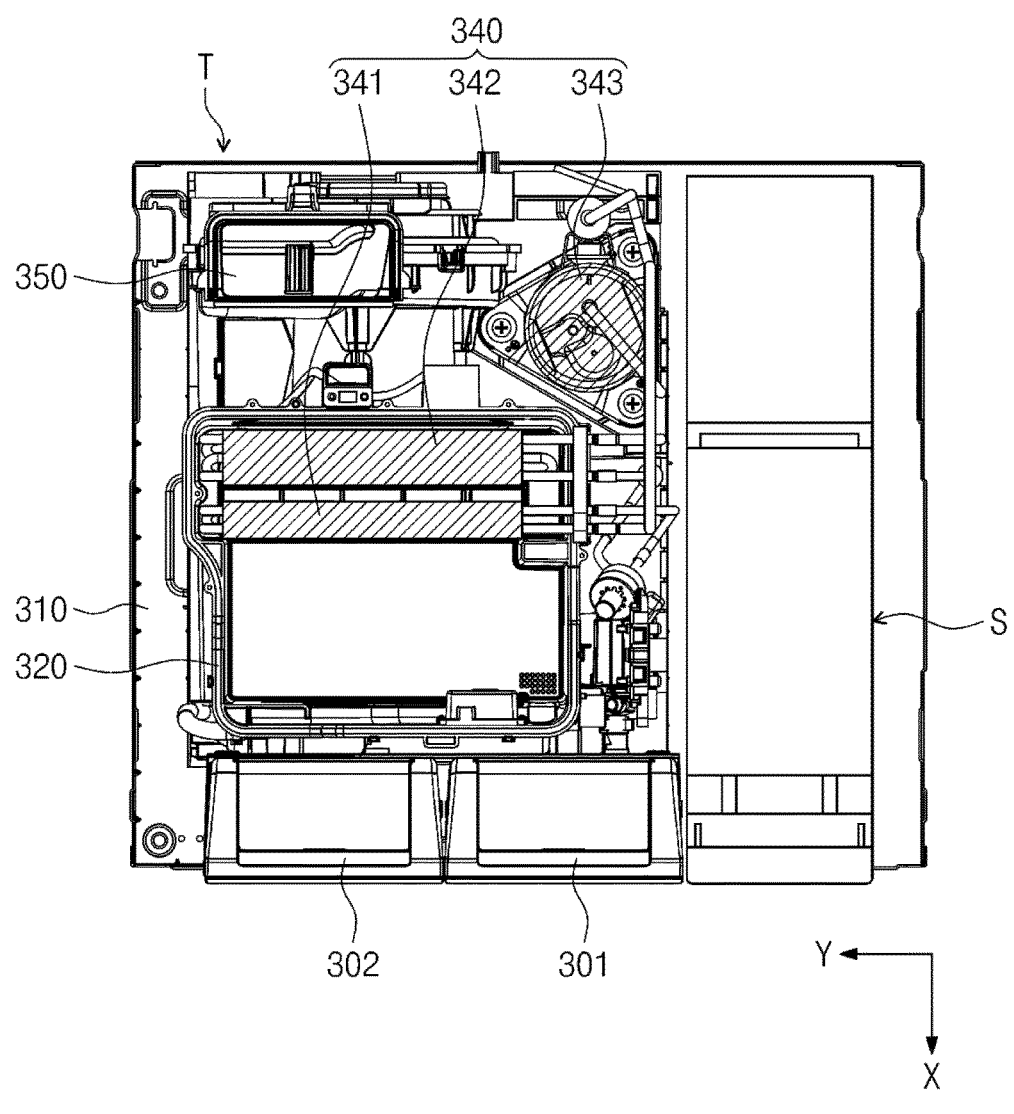
FIG. 9 shows inside of a circulation duct of a laundry treating apparatus of the present disclosure.

FIG. 9 shows inside of a circulation duct of a laundry treating apparatus of the present disclosure.

The circulation duct 320 may extend upward from the base bottom to form the flow channel through which air flows.

The heat supply 340 may include the evaporator 341 that cools and condenses air flowing along the circulation duct 320, the compressor 343 that receives the refrigerant from the evaporator 341 and compresses and heats the refrigerant, and the condenser 342 that receives the refrigerant from the compressor 343 and heats air flowing along the circulation duct 320.

The heat supply 340 may further include an expansion valve that expands the refrigerant that has passed through the condenser 342 to lower a temperature of the refrigerant.

The heat supply 340 may include the evaporator 341 that is installed inside the circulation duct 320 and is equipped as a heat exchanger that cools and dehumidifies air that has been introduced into the circulation duct 320, the condenser 342 that is equipped as a heat exchanger that heats air that has passed through the evaporator 341 to generate hot air, the compressor 343 that supplies the refrigerant that exchanges heat with air to the condenser 342 and is disposed outside the circulation duct 320, and an expansion valve 344 that expands and cools the refrigerant that has passed through the condenser 342.

The evaporator 341 and the condenser 342 may be disposed inside the circulation duct 320, and the compressor 343 may be disposed outside the circulation duct 320.

The circulation duct 320 may include the heat exchanger installation portion 3212 that provides a space in which the evaporator 341 and the condenser 342 are installed. The heat exchanger installation portion 3212 may be defined inside the duct body 321.

The duct body 321 may have an open top surface. The condenser 343 and the evaporator 341 may be introduced via the opening of the duct body 321 and installed.

The opening of the duct body 321 may be shielded by the base cover 360, and the base cover 360 and the duct body 321 may form a flow channel through which air flows inside the circulation duct 320.

A front surface of the duct body 321 may be disposed to be spaced rearwardly apart from a front end of the base bottom 311. As a result, the base bottom 311 may secure a support surface 3111 on which at least one of the water supply tank 301, the drainage tank 302, and the outside air duct 370 described above is installed and supported.

In one example, as the duct body 321 is integrally formed with the base 310, a height of the heat exchanger installation portion 3212 may be secured greater and heights of the condenser 343 and the evaporator 341 may also be increased to that extent accordingly.

As a result, widths in the front and rear direction of the condenser 343 and the evaporator 341 may be reduced, so that the number of refrigerant pipes passing through the condenser and the evaporator may be reduced. In addition, an effect of reducing a flow loss of air passing through the condenser and the evaporator is derived.

In one example, a sum of a length of the evaporator 341 and a length of the condenser 343 may be smaller than a length of the heat exchanger installation portion 3212. Accordingly, the length in the front and rear direction of the heat exchanger installation portion 3212 may be equal to or smaller than half of the length of the duct body 321.

The blower 350 may be disposed to overlap the condenser 343 or the evaporator 341 in the front and rear direction. Therefore, air that has passed through the evaporator 341 and the condenser 343 may be introduced into the blower 350 without bending of the flow channel. That is, in a process in which air introduced into the circulation duct 320 flows to the blower 350, because there is no bending in the flow channel, the flow loss may be minimized.

A length of the ironing module S may be greater than a length of the circulation duct 320.

Figure 10:
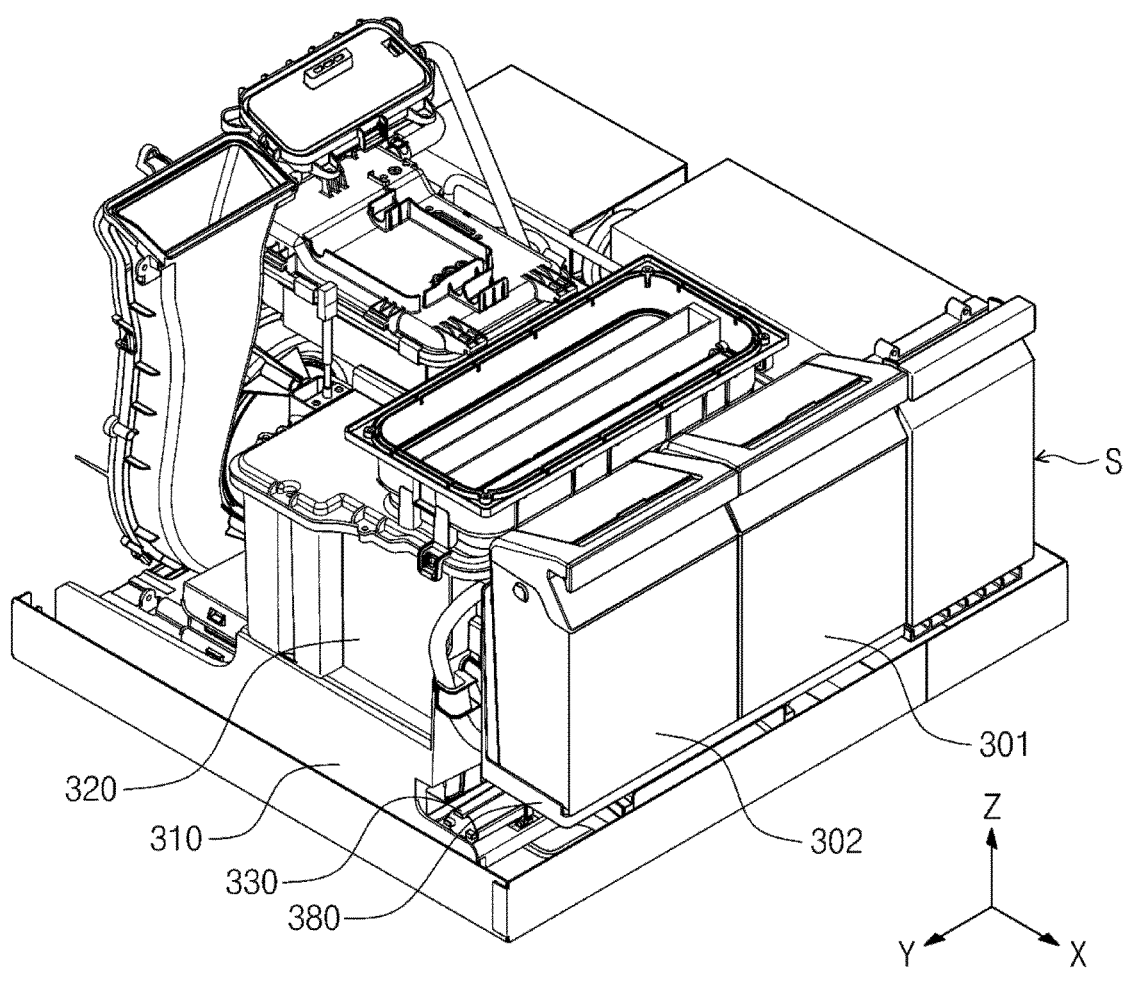
FIG. 10 shows a water supply and drainage system of a laundry treating apparatus of the present disclosure.

FIG. 10 shows a water supply and drainage system of a laundry treating apparatus of the present disclosure.

The laundry treating apparatus of the present disclosure may include the water supply tank 301 that supplies water to the steam supply 800 and the drainage tank 302 that collects condensed water from the circulation duct 320 or the ironing module S.

The water supply tank 301 and the drainage tank 302 should be selectively separated from each other in the machine room 300 for the user to easily fill the water supply tank 301 with water and discard water collected in the drainage tank 302.

The machine room 300 may further include a detachment portion 380 disposed in front of the refreshing module T to support the water supply tank 301 and the drainage tank 302. The detachment portion 380 may be detachably coupled to the water supply tank 301 and the drainage tank 302.

The detachment portion 380 may be formed in a plate shape to prevent the inside of the machine room 300 from being exposed.

A drainage pump 331 or the like may be disposed under the detachment portion 380, and the circulation duct 320 may be disposed at the rear of the detachment portion 380.

A portion of the ironing module S may extend through the detachment portion 380.

The ironing module S may be disposed on one side of one of the water supply tank 301 and the drainage tank 302. The ironing module S may not be disposed between the water supply tank 301 and the drainage tank 302. As a result, the length in the front and rear direction of the ironing module S may be sufficiently secured.

The ironing module S may be disposed closer to the water supply tank 301 than to the drainage tank 302. As a result, water may be easily supplied from the water supply tank 301, heated, and delivered to the steam iron 1300, a structure of receiving water from the water supply tank 301 may be simply designed, and a volume occupied by the structure may also be minimized.

Figure 11:
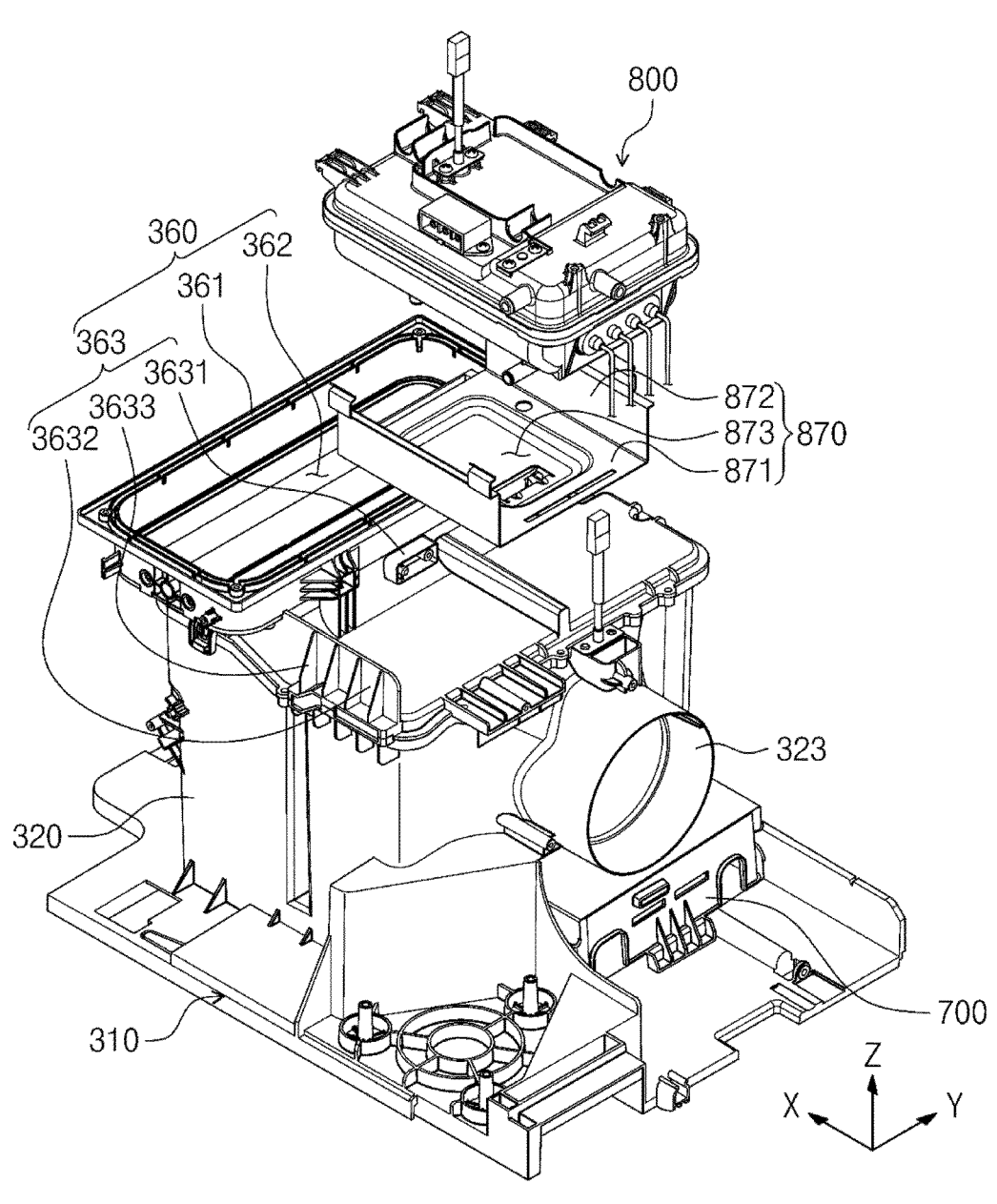
FIG. 11 shows an installation structure of a steam supply that receives water from a water supply tank.

FIG. 11 shows an installation structure of a steam supply that receives water from a water supply tank.

The steam supply 800 may be supported by being seated on the base cover 360.

The base cover 360 may include an inflow body 361 that is coupled to the top surface of the circulation duct 320 to allow the inner casing 200 and the circulation duct 320 to be in communication with each other, and a shielding body 363 that extends from the inflow body 361 to shield the top surface of the circulation duct 320.

The inflow body 361 may be formed in a duct shape and allow the inflow hole 232 of the inner casing and the inside of the circulation duct 320 to be in communication with each other. The inflow body 361 may protrude upwardly of the shielding body 363.

The inflow body 361 may be disposed in front of the evaporator 341 so as not to face the evaporator 341 and the condenser 343.

The inflow body 361 may serve as an inflow duct that allows air in the inner casing 200 to flow to the circulation duct 320. The inflow body 361 may be equipped with the inlet 362 through which air in the inner casing 200 may pass.

The inlet 362 may be partitioned into a plurality of sections, and a filter may be inserted into and installed in one of the sections.

The shielding body 363 may include a blocking panel 3631 that blocks the evaporator 341 and the condenser 343 from being exposed to the outside and supports the steam supply 800, a power terminal 3633 that extends from the blocking panel 3631 or the inflow body 361 and supplies power to the steam supply 800, and a protective panel 3632 that accommodates therein and protects one of both side surfaces of the steam supply 800.

A plurality of reinforcing ribs that reinforce rigidity may be disposed on an outer surface of the protective panel 3632. This prevents vibration or impact generated in the inner casing 200 or the machine room 300 from being transmitted to the steam supply 800.

The steam supply 800 may be supported by being seated on the base cover 360.

The steam supply 800 may include a steam casing 810 that stores water that generates steam.

The steam supply 800 may further include an installation bracket 870 that may fix the steam casing 810 to the base cover 360.

The installation bracket 870 may be coupled to the base cover 360 to fix the steam casing 810.

The installation bracket 870 may include a lower panel 871 that supports a bottom surface of the steam casing 810 and side panels 872 that support both side surfaces of the steam casing 810 on the lower panel 871.

The installation bracket 870 may further include a support panel 873 that extends stepwise from the lower panel 871 and supports the bottom surface of the steam casing 810. As a result, the lower panel 871 may accommodate therein and support a portion of the bottom surface of the steam casing 810.

The compressor 343 may be disposed under the steam supply 800.

The installation bracket 870 may block heat generated from the compressor or heat generated from the refrigerant compressed in the compressor from being transferred to the steam supply 800.

The installation bracket 870 may also block fire from being transferred to the steam supply 800 in the event of fire occurring in the compressor 343.

In one example, the base cover 360 may include a fastener 3631 that is disposed on the shielding body 363 and detachably coupled with the steam supply 800. The fastener 3631 may be formed in a structure that is detachably coupled with a protruding portion protruding from a lower portion of the steam casing 810.

Therefore, even when a large amount of water is contained inside the steam casing 810, the steam casing 810 may be stably seated on the base cover 360.

In addition, because the steam casing 810 is disposed upward of the circulation duct 320 and has a shorter distance to the inner casing 200, condensation of steam generated in the steam casing 810 before reaching the inner casing 200 may be minimized.

Figure 12:
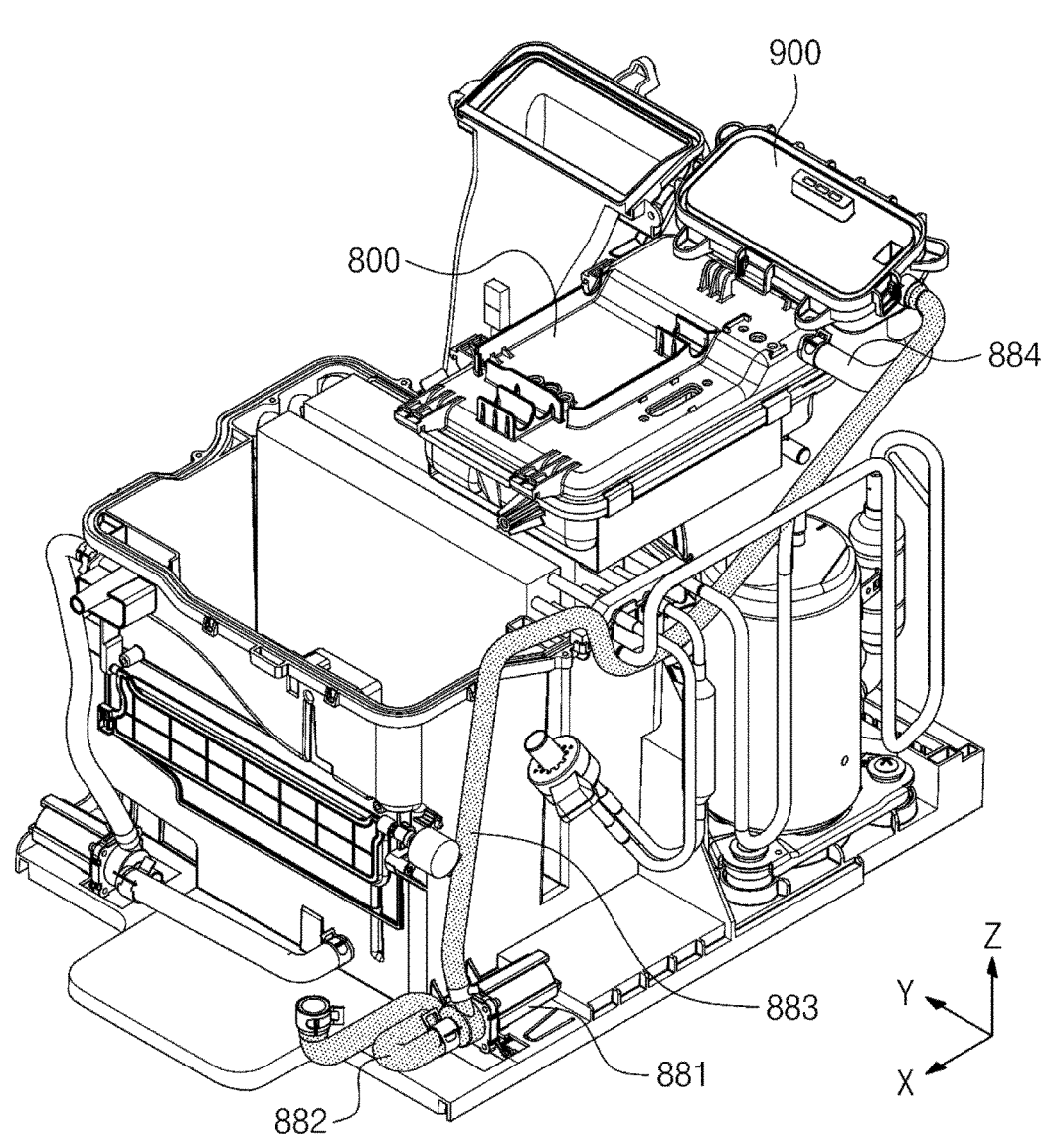
FIG. 12 shows a structure of supplying water to the steam supply.

FIG. 12 shows a structure of supplying water to the steam supply.

Steam generated inside the steam casing 810 may be directly supplied into the inner casing 200 via a steam pipe 823.

However, when steam is directly supplied into the inner casing 200 via the steam pipe 823, there is a concern that water contained in the steam casing 810 may also be discharged into the inner casing 200. In addition, there is a concern that water heated in the steam casing 810 may heat the bottom surface of the inner casing 200, causing thermal damage to the inner casing 200.

To prevent such problem, the steam supply 800 of the present disclosure may further include the steam nozzle 900 that receives steam generated in the steam casing 810 and supplies steam to the inner casing 200.

The steam nozzle 900 may be disposed to be spaced apart from the steam casing 810, and may receive only steam formed in the steam casing 810 and not receive water contained in the steam casing 810.

For example, the steam nozzle 900 may be disposed upward of the steam casing 810 and may be connected thereto via the steam pipe 823. Accordingly, steam generated in the steam casing 810 may rise because of a density difference and be supplied to the steam nozzle 900 along the steam pipe 823, and water contained in the steam casing 810 may not be introduced into the steam pipe 823 or the steam nozzle 900 because of gravity.

The steam nozzle 900 may be disposed between the bottom surface of the inner casing 200 and the steam casing 810, and may be in communication with the steam hole 233.

In one example, the steam supply 800 of the present disclosure may receive water from the water supply tank 301 and generate steam.

To this end, the laundry treating apparatus of the present disclosure may include a water supply 880 that supplies water contained in the water supply tank 301 to the steam supply 800.

The water supply 880 may include a water supply pump 881 that provides a pressure to supply water supplied to the water supply tank 301 to the steam supply 800 or the steam nozzle 900, a supply pipe 882 that is in communication with the water supply tank 301 and delivers water to the water supply pump 881, and a connection pipe 883 that connects the water supply pump 881 with the steam nozzle 900.

The supply pipe 882 may be formed as a hose connecting the water supply tank 301 with the water supply pump 881, and the connection pipe 883 may be formed as a hose connected to the water supply pump 881.

The laundry treating apparatus of the present disclosure may supply water contained in the water supply tank 301 to the steam nozzle 900 rather than to the steam casing 810.

The water supply pump 881 may not be directly connected to the steam casing 810.

The steam nozzle 900 may receive water via the connection pipe 883 and then supply water to the steam supply 800 via a water supply pipe 884. The water supply pipe 884 may be connected to a recovery pipe 824.

Because the steam nozzle 900 is disposed upward of the steam casing 810, water supplied to the steam nozzle 900 may be automatically supplied to the steam casing 810 via the water supply pipe 884.

The steam pipe 823 through which steam is introduced into the steam nozzle 900 and the recovery pipe 824 through which water is discharged from the steam nozzle 900 may be formed as separate flow channels. Therefore, water supplied from the steam nozzle 900 may be prevented from interfering with flow of steam supplied from the steam casing 810.

In one example, the water supply pipe 884 may be formed in a U-shape. That is, a middle area of the water supply pipe 884 may be disposed at a lower vertical level than both ends thereof. As a result, a certain amount of water, like a water trap, may be accumulated in the water supply pipe 884, thereby preventing steam or water supplied from the steam casing 810 from being re-introduced via the water supply pipe 884.

In addition, because the steam casing 810 is not directly connected to the water supply pump 881, a possibility that water introduced into the steam casing 810 may flow back into the water supply pump 881 may be blocked.

In addition, a large amount of water may be supplied to the steam nozzle 900 at a considerable pressure via the water supply pump 881. As a result, foreign substances, bacteria, or the like accumulated or growing in the steam nozzle 900 may be washed away by water supplied to the steam nozzle 900 and may go down into the steam casing 810. Therefore, the steam nozzle 900 may always be maintained in a clean state.

In one example, when steam supplied from the steam nozzle 900 is condensed, condensed water may be reintroduced into the steam casing 810 via the water supply pipe 884. That is, condensate generated from the steam nozzle 900 may be recovered into the steam casing 810 in the same direction as a flow direction of water supplied from the water supply pump 881, and may be recycled as water that generates steam. Therefore, the laundry treating apparatus of the present disclosure may prevent a water level of the water supply tank 301 from rapidly decreasing and also prevent waste of water.

Figure 13:
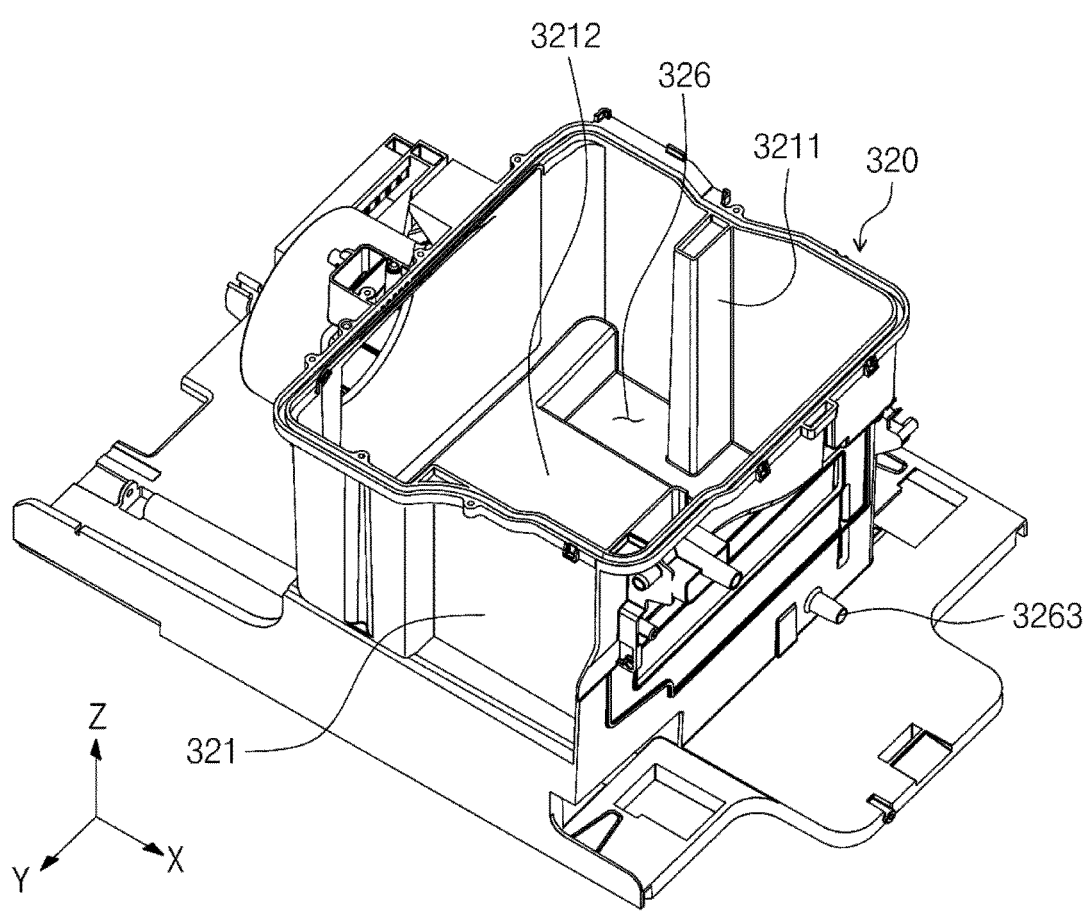
FIG. 13 shows a drainage structure of a laundry treating apparatus of the present disclosure.

FIG. 13 shows a drainage structure of a laundry treating apparatus of the present disclosure.

In the laundry treating apparatus of the present disclosure, when the compressor 343 and the blower fan 353 are operated, air supplied from the outside of the cabinet 100 and air supplied from the inner casing 200 are cooled while passing through the evaporator 341, and water vapor contained in the air is condensed.

Water condensed in the evaporator 341 may accumulate on the bottom surface of the circulation duct 320.

The laundry treating apparatus of the present disclosure may include a reservoir 326 defined as a portion of the bottom surface of the duct body 321 is recessed to collect condensate condensed in the evaporator 341.

The reservoir 326 is a space defined as the portion of the bottom surface of the duct body 321 is recessed, and is able to form one side surface of a controller installation portion 313.

The reservoir 326 may be defined to be recessed downward from the bottom surface of the circulation duct 320.

The reservoir 326 may be formed integrally with the circulation duct 320. The reservoir 326 may be formed by forming the portion of the bottom surface of the circulation duct 320 to be recessed while injection-molding the circulation duct 320 onto the base 310.

The reservoir 326 may have at least a portion of a top surface thereof disposed parallel to the heat exchanger installation portion 3212.

The base 310 may include a guide pipe 3263 that discharges water collected in the reservoir 326 to the outside.

The guide pipe 3263 may protrude from a lower portion of the reservoir 326 to the outside of the circulation duct 320. The guide pipe 3263 may discharge water stored in the reservoir to the outside of the base. This may prevent water collected in the reservoir 326 from decaying or flowing back to the bottom surface of the circulation duct 320.

The circulation duct 320 may include a partition wall 3211 that extends from an inner surface of the duct body 321. The partition wall 3211 may protrude inwardly from an inner wall of the circulation duct 320, or an outer wall of the circulation duct 320 may be recessed inward and protrude inward. The partition wall 3211 may guide a location where the heat exchanger 341 and 343 is installed, and may prevent air entering the heat exchanger from passing by bypassing the heat exchanger. The partition wall 3211 may be disposed in the reservoir 326.

Figure 14:
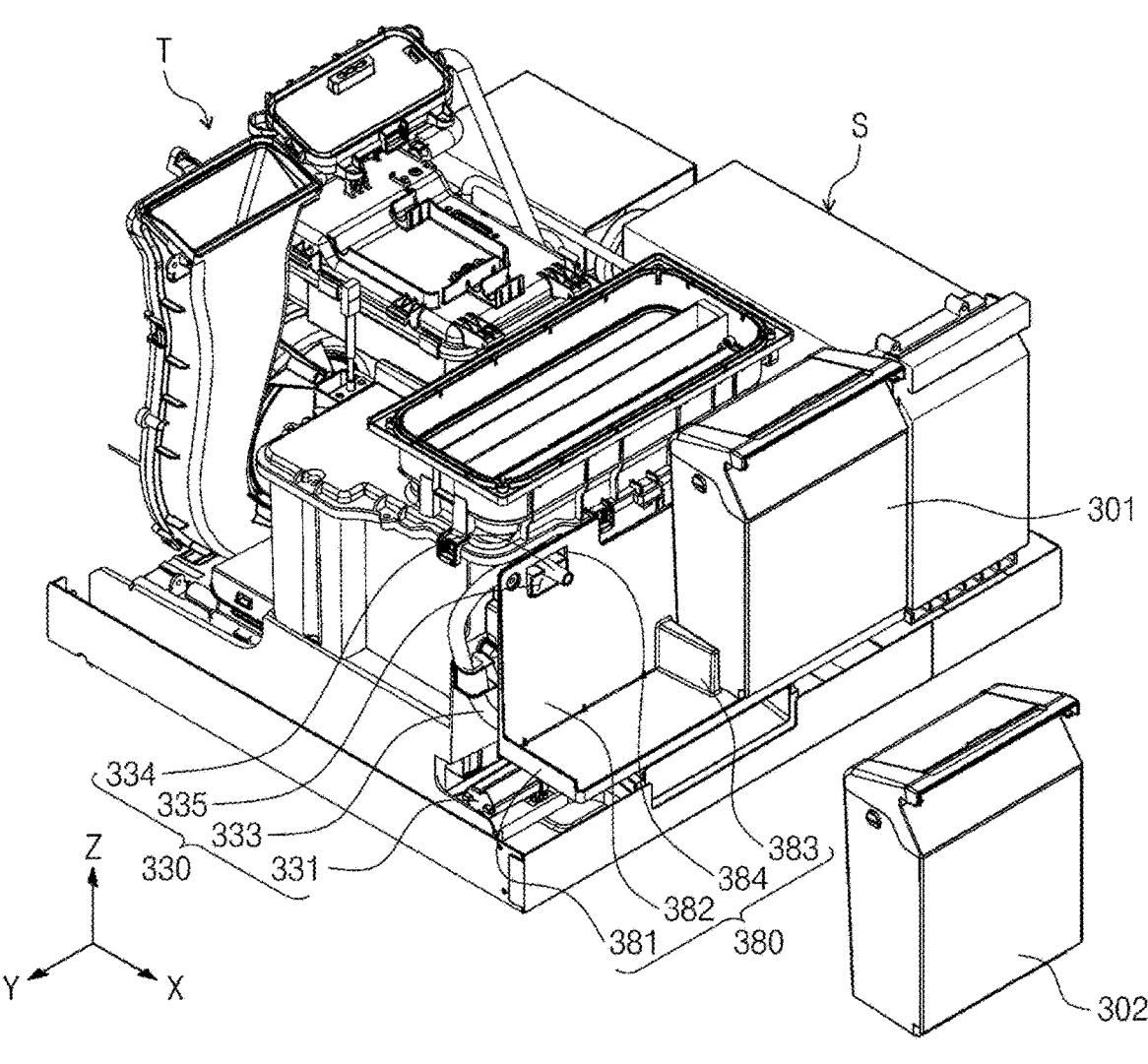
FIG. 14 shows a drainage tank installation structure of a laundry treating apparatus of the present disclosure.

FIG. 14 shows a drainage tank installation structure of a laundry treating apparatus of the present disclosure.

The drainage tank 302 may be formed in a shape of a box that stores water.

The drainage tank 302 may include a supply hole for receiving water defined in a rear surface, and the supply hole may be defined closer to an upper end than to the bottom surface of the drainage tank 302.

The detachment portion 380 may include a load support 381 on which at least one of the drainage tank 302, the water supply tank 301, and the ironing module S may be supported, and a detachment support 382 disposed on the load support 381 in front of the circulation duct 320 and on which the drainage tank 302 and the water supply tank 301 may be seated.

The load support 381 may be formed in a plate shape to support bottom surfaces of the water supply tank 301 and the drainage tank 302, and the detachment support 382 may also be formed in a plate shape to support rear surfaces of the water supply tank 301 and the drainage tank 302.

The detachment portion 380 may include a detachment separator 383 protruding from the load support 381 so as to be disposed between the water supply tank 301 and the drainage tank 302. The detachment separator 383 may separate the water supply tank 301 and the drainage tank 302 from each other by a predetermined spacing. As a result, when one of the water supply tank 301 and the drainage tank 302 is withdrawn, the other of the water supply tank 301 and the drainage tank 302 may be prevented from being withdrawn arbitrarily.

The laundry treating apparatus of the present disclosure may further include a drainage 330 that collects water condensed in the circulation duct 320 into the drainage tank 302.

The drainage 330 may include the drainage pump 331 that receives water from the guide pipe 3263 and a drainage hose 333 that receives water from the drainage pump 331 and guides water to the drainage tank 302.

The drainage 330 of the present disclosure may further include a discharge pipe 334 that allows the drainage hose 333 and the drainage tank 302 to be in communication with each other. The discharge pipe 334 may receive water from the drainage hose 333 and guide water into the drainage tank 302.

In one example, the discharge pipe 334 may be directly connected to the drainage hose 333 or may be formed integrally with the drainage hose 333.

However, the laundry treating apparatus of the present disclosure may install the discharge pipe 334 in the circulation duct 320 such that water may be continuously supplied even when a water level inside the drainage tank 302 reaches a full level, and the circulation duct 320 may be constructed to receive water flowing back from the discharge pipe 334 or the drainage tank 302 again therein.

As a result, the circulation duct 320 and the reservoir 326 may temporarily perform the role of the drainage tank 302 to expand a water storage capacity. As a result, water may be prevented from overflowing out of the drainage tank 302.

For example, the detachment portion 380 may include a detachment communication portion 384 that is defined to extend through the detachment support 382 so as to allow the drainage hose 333 and the drainage tank 302 to be in communication with each other.

The detachment communication portion 384 may be defined in an area facing the supply hole defined in the drainage tank when the drainage tank 302 is seated on the load support 381.

The discharge pipe 334 may extend from the circulation duct 320 or may extend from the detachment portion 380. The discharge pipe 334 may be formed as an injection-molded product. Accordingly, the discharge pipe 334 may stably fix a distal end of the drainage hose 333 and prevent the drainage hose 333 from being bent abruptly.

In addition, the discharge pipe 334 may be formed as an injection-molded product in a shape of a pipe fixed to the circulation duct 320 or the support 381, so that an installation location thereof may always be fixed. Accordingly, a distal end of the discharge pipe 334 and the supply hole defined in the drainage tank 302 are always positioned in correct locations, so that condensate supplied from the drainage pump 331 may be stably introduced into the drainage tank 302.

The laundry treating apparatus of the present disclosure may further include a backflow portion 335 that allows water contained inside the drainage tank 302 to flow back into the circulation duct 320 or the drainage 330.

The backflow portion 335 may be formed under the discharge pipe 334 and may allow the circulation duct 320 and the inside of the drainage tank 302 to be in communication with each other. The backflow portion 335 may receive water inside the drainage tank 302 and guide water into the circulation duct 320.

Figure 15:
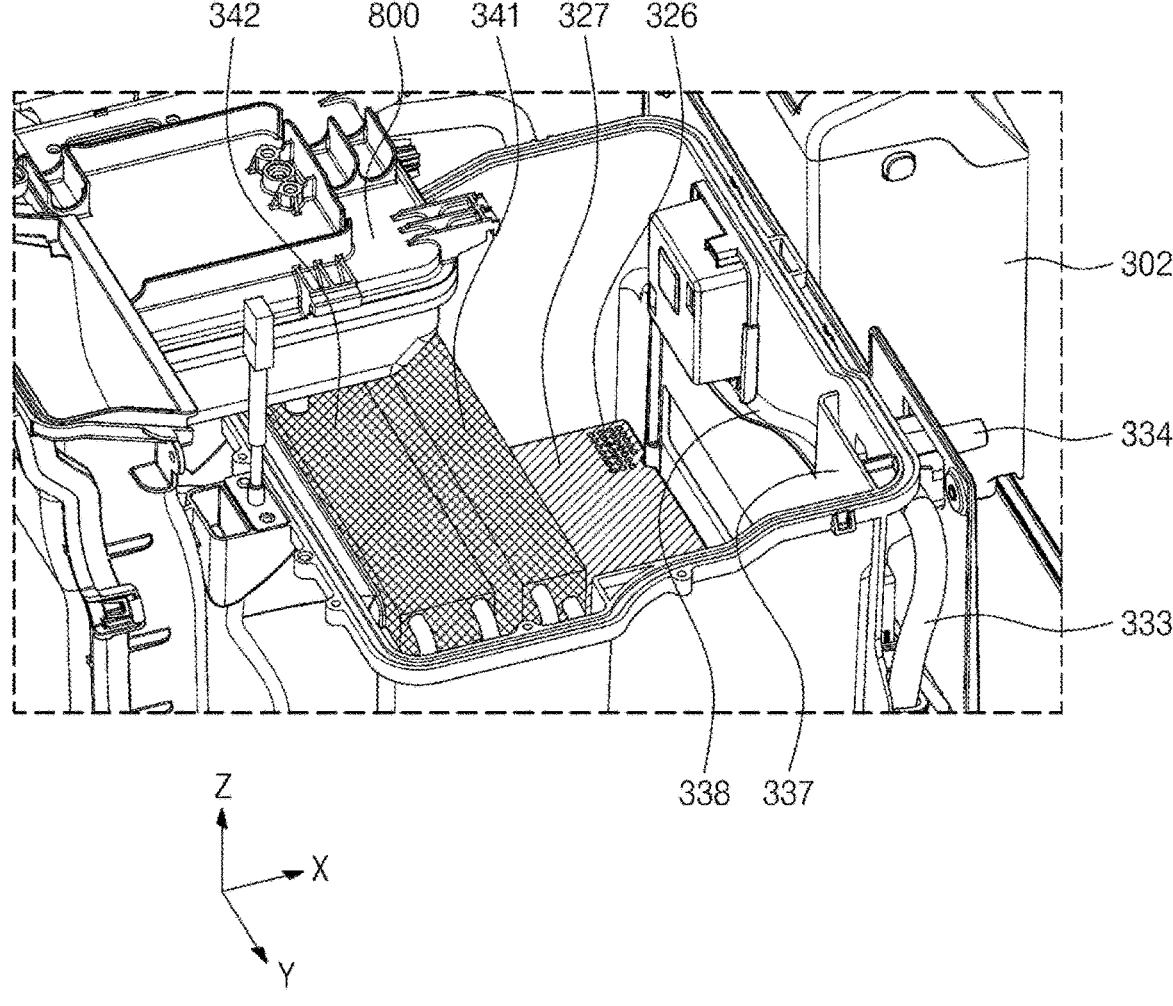
FIG. 15 shows in detail a structure of a backflow portion of a laundry treating apparatus of the present disclosure.

FIG. 15 shows in detail a structure of a backflow portion of a laundry treating apparatus of the present disclosure.

The circulation duct 320 may have the evaporator 341 and the condenser 343 disposed therein. In this regard, the evaporator 341 may be disposed in front of the condenser 343 in the circulation duct 320.

The backflow portion 335 may be defined in a front surface of the circulation duct 320. In this regard, when water introduced into the circulation duct 320 from the backflow portion 335 comes into contact with the evaporator 341 or the like, the evaporator 341 may be unnecessarily corroded or contaminated and an efficiency of the evaporator 341 in cooling air may decrease.

Therefore, to prevent water supplied from the backflow portion 335 from coming into contact with the evaporator 341 along air directed toward the evaporator 341, the evaporator 341 may be disposed closer to a rear side of the circulation duct 320 than the backflow portion 335.

The backflow portion 335 or the discharge pipe 334 may be exposed forward of the circulation duct 320 by extending through the detachment communication portion 384. When the drainage tank 302 is seated on the detachment support 382, a distal end of the backflow portion 335 or the discharge pipe 334 may be inserted into the drainage tank 302.

As a result, water discharged out of the circulation duct 320 via the drainage pump 331 may be collected in the drainage tank 302 along the drainage hose 333 and the discharge pipe 334.

When the water level of the drainage tank 302 reaches the discharge pipe 334 or the backflow portion 335, water overflowing out of the backflow portion 335 may be introduced into the circulation duct 320 again along the backflow portion 335 and be prevented from leaking out of the machine room 300.

A guide flow channel 338 may extend along a width direction of the front surface of the circulation duct 320. One end of the guide flow channel 338 may be disposed to be in communication with the backflow portion 335, and the other end thereof may be disposed above the reservoir 326.

In addition, the circulation duct 320 may further include a blocking wall 337 that guides water introduced from the backflow portion 335 to the guide flow channel 338.

Figure 16:
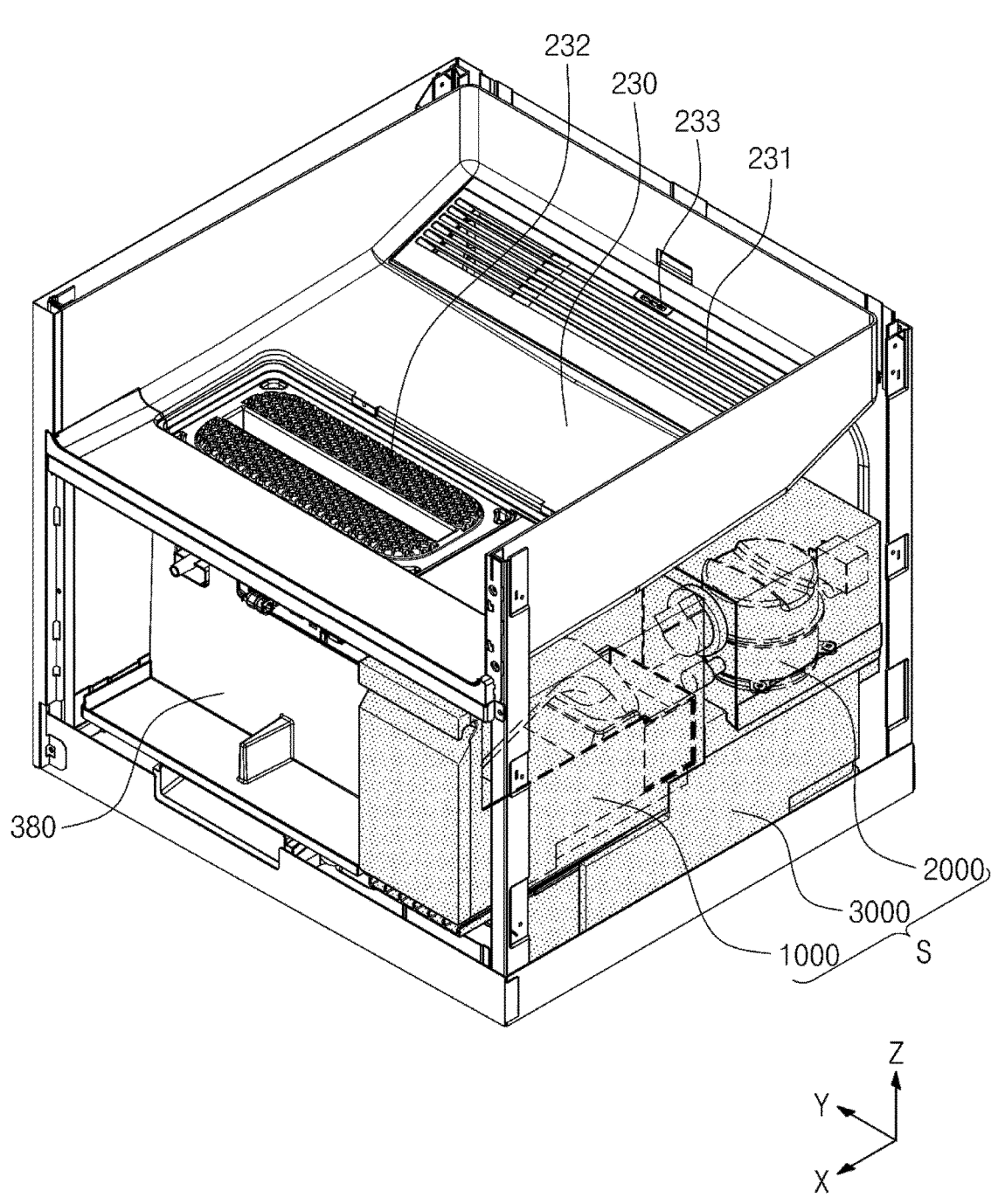
FIG. 16 shows a lower configuration of a bottom surface of an inner casing.

FIG. 16 shows a lower configuration of a bottom surface of an inner casing.

The bottom surface 230 may introduce air inside the inner casing 200 into the circulation duct 320 via the inflow hole 232, and may receive air dehumidified and heated while passing through the circulation duct 320, via the exhaust hole 231. In addition, steam supplied from the steam supply 800 may be received via the steam hole 233.

However, the bottom surface 230 except for the through-holes may block air, moisture, and foreign substances inside the inner casing 200 from flowing out into the machine room 300.

The detachment portion 380 may be disposed in a front side of the machine room 300 to prevent external air, moisture, and foreign substances from being introduced into the machine room 300.

The laundry treating apparatus of the present disclosure may install the ironing module S in the machine room 300. As a result, the ironing module S may be prevented from being exposed to air, moisture, and the foreign substances inside the inner casing 200.

In addition, the machine room 300 may have the entire components disposed under the bottom surface 230, so that the machine room 300 may be disposed and installed independently of the inner casing 200. As a result, the machine room 300 may be manufactured as a module and installed in the cabinet 100.

The ironing module S may be installed in the machine room 300 in a modular manner. Therefore, the ironing module S may also be selectively installed in the machine room 300 without affecting the internal configurations of the machine room 300 and the cabinet 100.

Therefore, even when the laundry treating apparatus of the present disclosure is a product that does not have the ironing module S, the ironing module S may be installed in the machine room 300 in the future.

The ironing module S may be disposed to one of both side surfaces of the machine room 300. The ironing module S may minimize interference with existing components such as the circulation duct 320.

The ironing module S may further include a storage module 1000 that may store the steam iron 1300, which supplies at least one of heat and steam to the laundry, inside the machine room 300, and a heating module 2000 including the steam generator 2100, which generates at least one of heat and steam to be supplied to the steam iron 1300.

The heating module 2000 may be disposed at the rear of the storage module 1000, and the storage module 1000 may be exposed forward of the machine room 300. As a result, the steam iron 1300 may be withdrawn forward of the machine room 300 and be accessible to the laundry.

The detachment portion 380 may have a passage surface that supports the steam iron 1300 so as to be withdrawn forward from the inside of the machine room 300.

The ironing module S may further include a base module 3000 that supports the storage module 1000 and the heating module 2000. The base module 3000 may provide a space in which the storage module 1000 and the heating module 2000 are installed, and may fix locations and a connected state of the storage module 1000 and the heating module 2000.

In addition, the base module 3000 may be constructed to position the storage module 1000 and the heating module 2000 above the base 310 or the bottom surface of the cabinet by a predetermined vertical dimension or more.

As a result, condensed water or residual water in the storage module 1000 and the heating module 2000 may be automatically discharged by gravity, and the storage module 1000 and the heating module 2000 may be prevented from being damaged by vibration or impact.

The storage module 1000 and the heating module 2000 may be mounted on the base module 3000 and installed inside the machine room 300.

In one example, when the storage module 1000 and the heating module 2000 may be stably installed in the machine room 300, the base module 3000 may be omitted.

Figure 17:
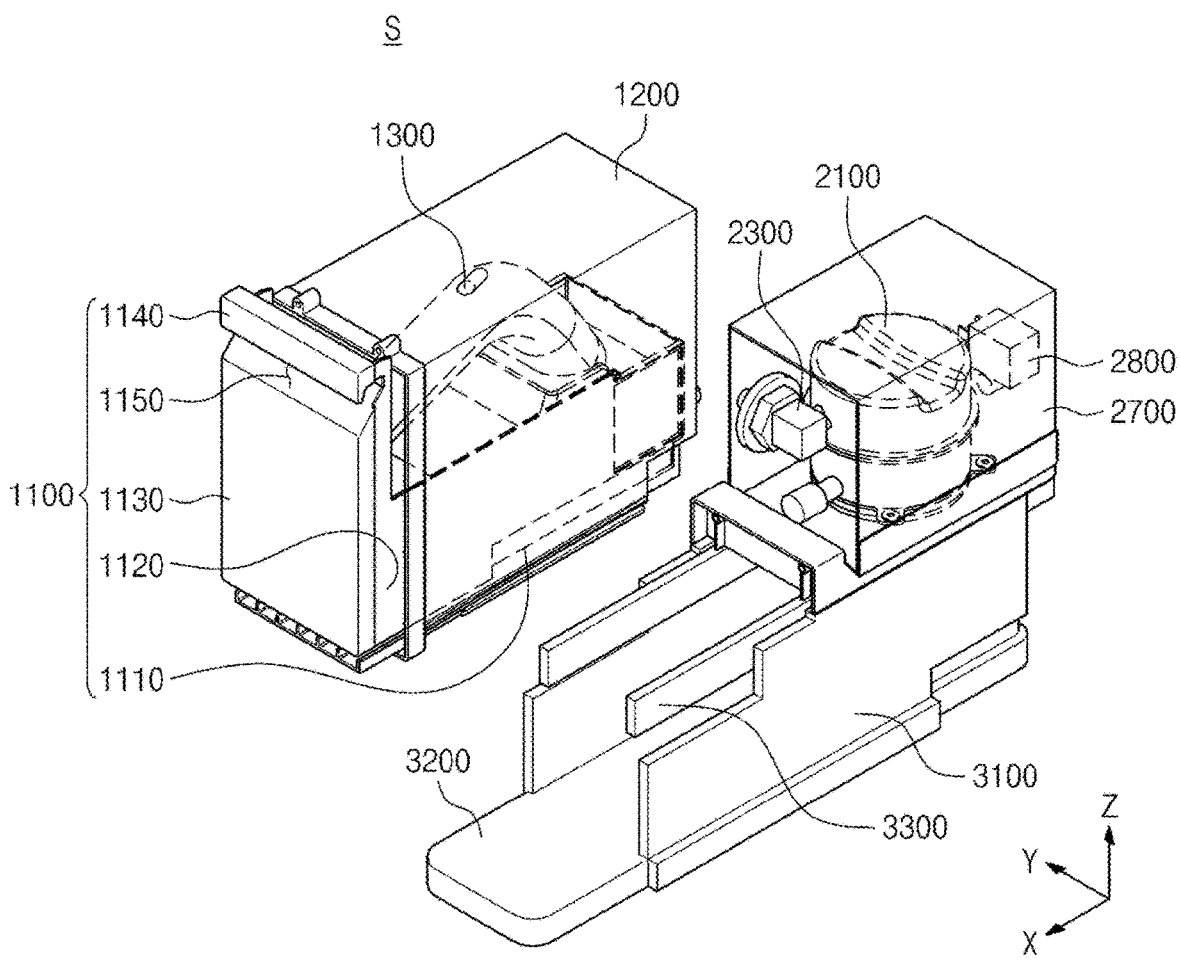
FIG. 17 shows a structure of the ironing module in detail.

FIG. 17 shows a structure of the ironing module in detail.

The storage module 1000, the heating module 2000, and the base module 3000 may be manufactured integrally, or may be manufactured separately and then coupled and fixed to each other.

Hereinafter, a description will be made based on the storage module 1000, the heating module 2000, and the base module 3000 being constructed as independent modules, but it is not excluded that they are manufactured integrally.

The storage module 1000, the heating module 2000, and the base module 3000 may be manufactured independently of each other and installed in the machine room 300. Accordingly, the storage module 1000, the heating module 2000, and the base module 3000, which have volumes smaller than that of the entire ironing module S, may be installed sequentially in the machine room 300, so that a work of installing the ironing module S in the machine room 300 may be easy.

In addition, when one of the storage module 1000, the heating module 2000, and the base module 3000 is damaged or defective, it is required to replace or repair only the specific module, so that maintenance and repair of the ironing module S may be easy.

The storage module 1000 may include the steam iron 1300 that may approach the laundry and supply at least one of heat and steam to the laundry.

The steam iron 1300 may have a surface, facing the laundry, made of a material that may transmit heat, so that when the steam iron 1300 comes into contact with the laundry, steam iron 1300 may remove the wrinkles from the laundry.

In addition, the steam iron 1300 may include a spray hole through which steam is sprayed onto the surface thereof facing the laundry, so that high-temperature steam may be supplied to the surface of the laundry to not only remove the wrinkles from the laundry, but also perform a refreshing process such as sterilization and deodorization of the laundry.

The steam iron 1300 may generate heat and steam by being supplied with power on its own, but may receive at least one of heat and steam from the heating module 2000 and transmit the same.

When the steam iron 1300 is equipped to receive at least one of heat and steam, a weight and a volume of the steam iron 1300 may be reduced, so that the user may easily lift the steam iron 1300 up to the surface of the laundry hung on the hanger or the fixer.

The storage module 1000 may further include the storage box 1200 that accommodates the steam iron 1300 therein. The storage box 1200 may be formed in a casing shape that has an accommodating space for storing the steam iron 1300 inside.

The storage box 1200 may serve to store the steam iron 1300 inside the machine room 300, and may perform a role of varying a location where the steam iron 1300 is arbitrarily stored inside the machine room 300.

A width of the storage box 1200 may be greater than a width of the steam iron 1300, and a length of the storage box 1200 may be greater than a length of the steam iron 1300.

For example, the width of the storage box 1200 may be about 1 to 3 cm greater than the width of the steam iron 1300. However, the width of the storage box 1200 may not be greater than the width of the steam iron 1300 by 5 cm or more. This may prevent the steam iron 1300 from vibrating or moving in the left and right direction inside the storage box 1200.

The storage box 1200 may have a length in the front and rear direction greater than a width in the left and right direction, and may have a height in the vertical direction greater than the width in the left and right direction. Accordingly, the steam iron 1300 may be stably inserted into and stored inside the storage box 1200.

The storage box 1200 may include the storage body 1210 that accommodates the steam iron 1300 therein, and the open surface 1220 defined in the front surface of the storage body 1210 and from which the steam iron 1300 may be withdrawn.

The storage body 1210 may accommodate the steam iron 1300 therein so as to block the steam iron 1300 from being exposed to an upper side, both side surfaces, and a rear side of the machine room.

The storage body 1210 may accommodate therein and withdraw the steam iron 1300 only through the open surface 1220. As a result, the steam iron 1300 may be exposed only forward of the machine room 300, and may be prevented from being exposed or withdrawn in other directions.

The open surface 1220 may open the entire front surface of the storage body 1210. When the steam iron 1300 is able to be withdrawn and inserted, only a portion of the front surface of the storage body 1210 may be opened.

The storage module 1000 may further include an extendable portion 1100 that exposes the steam iron 1300 forward of the storage box 1200.

The extendable portion 1100 may support the steam iron 1300 inside the storage box 1200. The steam iron 1300 may be seated on the extendable portion 1100 and stored inside the storage box 1200.

The extendable portion 1100 may expose at least a portion of the steam iron 1300 stored inside the storage box 1200 to the outside of the storage box 1200 The extendable portion 1100 may extend the steam iron 1300 forward of the storage box 1200 and expose the steam iron 1300 forward of the machine room 300 or the detachment portion 380. Accordingly, even when the steam iron 1300 is stored in the storage box 1200, the steam iron 1300 may be easily withdrawn out of the machine room 300.

The extendable portion 1100 may be of a drawer type that is extended forward from the storage box 1200, or may be of a hatch type that is opened by pivoting forward at a front side of the storage box 1200.

The extendable portion 1100 may be equipped as any component as long as it is able to selectively expose the steam iron 1300 forward of the storage box 1200 while storing the steam iron 1300 inside the storage box 1200.

The extendable portion 1100 may include a support 1120 on which the steam iron 1300 is mounted, and a cover 1130 disposed in front of the support 1120 to shield the open surface 1220.

The support 1120 may be accommodated in the storage box 1200 and fix the steam iron 1300. The support 1120 may be formed in a casing shape that accommodates the steam iron 1300 therein, or may be formed in a plate shape that supports a lower portion of the steam iron 1300. The support 1120 may be constructed as a drawer accommodated in the storage body 1210 and retracted and extended via the open surface 1220.

When the support 1120 is extended from the open surface 1220, the steam iron 1300 mounted on the support 1120 may be withdrawn forward of the storage box 1200, and when the support 1120 is inserted into the open surface 1220, the steam iron 1300 mounted on the support 1120 may be completely accommodated in the storage box 1200.

The extendable portion 1100 may further include a cover panel 1130 that extends from a front side of the support 1120 and shields the open surface 1220. The cover panel 1130 may prevent the inside of the storage body 1210 from being exposed to the outside via the open surface 1220. As a result, not only the steam iron 1300 accommodated in the storage body 1210, but also an entirety of the inside of the ironing module S may be prevented from being contaminated with foreign substances, steam, or air.

The cover panel 1130 may shield a through-hole defined to allow the extendable portion 1100 to be extended from the detachment portion 380. As a result, the inside of the machine room 300 may be prevented from being exposed to the outside because of the through-hole, and the foreign substances, steam, or air may be prevented from being introduced into the machine room 300.

An area size of the cover panel 1130 may be greater than that of a front surface of the support 1120. The area size and a shape of the cover panel 1130 may be an area size and a shape that may completely shield a space where the ironing module S is exposed in the detachment portion 380.

A width of the cover panel 1130 may be the same as a width of the support 1120 or a width of the open surface 1220, and a height of the cover panel 1130 may be greater than a height of the support 1120 and the same as a height of the open surface 1220.

A recessed portion 1150 that is recessed inward and an extendable portion handle 1140 disposed on the recessed portion 1150 may be disposed at an upper portion of the cover panel 1130.

The extendable portion 1100 may include a guide groove 1110 at a lower portion of the support 1120 to guide the support 1120 to slide in the front and rear direction without moving in the left and right direction.

The guide groove 1110 may be engaged with a rail disposed inside the storage body 1210 or a rail 3300 disposed in the base module 3000 and inserted into the storage body 1210. When the guide groove 1110 moves forward and rearward along the rail 3300, the entire extendable portion 1100 may be extended from or retracted via the open surface 1220.

The storage body 1210 may have an insertion hole defined in a lower portion of a rear surface thereof into which the rail 3300 may be inserted. In addition, the storage body 1210 may include an open hole through which the cable 1400 extending from the heating module 2000 may pass through the rear surface.

The insertion hole and the open hole may be integrally defined.

However, the steam iron 1300 may be prevented from being withdrawn or exposed via the insertion hole and the open hole. For example, the insertion hole and the open hole may be defined lower than the support 1120 or the steam iron 1300.

The heating module 2000 may include a heat generator 2100 that supplies heat and steam to the steam iron 1300. The heat generator 2100 may receive power, heat a wire, and transmit heat to the steam iron 1300 via the cable 1400, or heat water to generate steam and transmit steam to the steam iron 1300 via the cable 1400.

For example, the heat generator 2100 may be equipped as the steam generator that receives power and water to generate steam.

The steam generator 2100 may be equipped separately from the steam supply 800 seated in the machine room 300. The steam generator 2100 may receive water and power and heat water to generate steam.

In addition, the steam generator 2100 may supply steam up to the steam iron 1300, and generate steam of a higher pressure than the steam supply 800 such that steam supplied up to the steam iron 1300 may be sprayed onto the laundry.

The steam generator 2100 may be coupled with a connector 2800 that receives power and may include a pressure sensor that senses the pressure of steam generated inside.

The steam generator 2100 may be equipped as any component as long as it is able to receive water and heat steam. The steam generator 2100 may include a steam container forming an outer appearance thereof and a steam heater that is disposed inside the steam container and heats water.

In addition, the heating module 2000 may be connected to a high-pressure pump 2200 that increases a pressure inside the steam generator 2100 to induce the generation of high-pressure steam.

The heating module 2000, unlike the storage module 1000, may be prevented from being withdrawn from the machine room 300. That is, when the heating module 2000 is installed in the machine room 300, the heating module 2000 may be fixed inside the machine room 300. For example, the heating module 2000 may be mounted on and fixed on the base module 3000.

Entire components of the heating module 2000 may be positioned at the rear of the storage module 1000. As a result, the exposure of the storage module 1000 forward of the machine room 300 and the forward withdrawal and the rearward insertion of the steam iron 1300 from and into the machine room may not be hindered. In addition, the storage module 1000 may be prevented from being exposed rearward of the machine room 300.

The heating module 2000 may be mounted and fixed on the base module 3000 or the base 310. For the entire components of the heating module 2000 to be stably installed, an entirety of the heating module 2000 may be accommodated in a heating casing 2700. The heating casing 2700 may have an open surface in a front surface thereof through which the cable 1400 may pass, and may be formed in a box shape with both side surfaces and a top surface not exposed to the outside.

Most of the components of the heating module 2000 may be installed inside the heating casing 2700. Therefore, maintenance and repair of the heating module 2000 may be easy.

The base module 3000 may include a base panel 3200 disposed in parallel with the base 310, and a seating panel 3100 extended from the base panel 3200 and on which the storage module 1000 and the heating module 2000 are seated.

The base panel 3200 may be formed integrally with the base 310.

However, when the ironing module S is constructed as the module independent of the circulation duct 320, the base panel 3200 may be formed separately from the base 310.

The seating panel 3100 may fix the lower portions of the storage module 1000 and the heating module 2000, but space the storage module 1000 and the heating module 2000 apart from the base panel 3200 by a certain vertical dimension.

As a result, a space in which the water supply structure connected to the cable 1400 or the heating module 2000 to supply water to the heating module 2000 and the drainage structure to discharge water from the heating module 2000 may be installed between the storage module 1000, the heating module 2000, and the base panel 3200.

Furthermore, because the storage module 1000 and the heating module 2000 are disposed upward of the drainage structure because of the seating panel 3100, condensate or residual water generated in the storage module 1000 and the heating module 2000 may be guided to the drainage structure without a separate power member.

The seating panel 3100 may extend upward from both side surfaces of the base panel 3200.

The base module 3000 may be coupled with the rail 3300 that is coupled to an inner surface of the seating panel 3100 and extends the extendable portion 1100.

Figure 18:
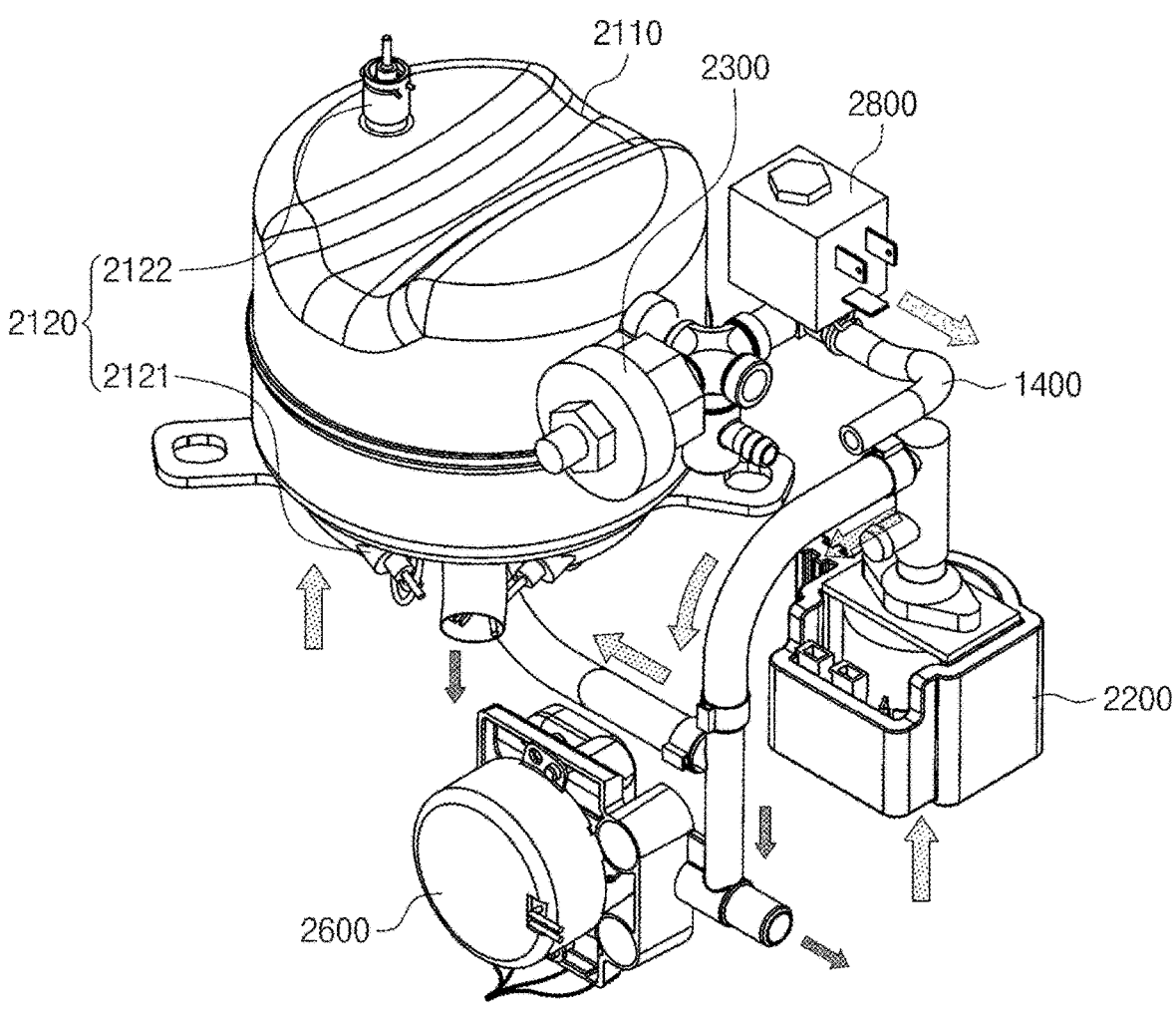
FIG. 18 shows a water supply and drainage structure of the heating module 2000.

FIG. 18 shows a water supply and drainage structure of the heating module 2000.

For the steam generator 2100 to generate steam and deliver steam to the steam iron 1300, water needs to be supplied.

To this end, the steam generator 2100 may include the high-pressure pump 2200 that is connected to the water source and supplies water to the steam generator 2100.

The high-pressure pump 2200 may be in communication with the water supply tank 301 and receive water from the water supply tank 301.

In one example, the high-pressure pump 2200 may receive water from a water source different from the water supply tank and supply water to the steam generator 2100.

In one example, the high-pressure pump 2200 may not simply supply water to the steam generator 2100, but may supply water while increasing the pressure inside the steam generator 2100. As a result, water may be heated while the pressure inside the steam generator 2100 is higher than an atmospheric pressure, thereby generating high-pressure steam.

The steam generator 2100 may include the pressure sensor 2300 that measures the internal pressure.

The pressure sensor 2300 may be in communication with the exit 2150 extending from the body 2110, and a steam valve 2800 that opens and closes the exit 2150 may be coupled.

The steam valve 2800 may be controlled by a control panel of the ironing module S. the opening and closing of the steam valve 2800 may be controlled based on a pressure and a temperature inside the body 2110 or a pressure and a temperature of the exit 2150.

The cable 1400 may have one end connected to the steam valve 2800 and the other end connected to the steam iron 1300.

When the steam valve 2800 is opened, steam generated by the steam generator 2100 may be supplied to the steam iron 1300, and when the steam valve 2800 is closed, the supply of both water and steam to the steam iron 1300 may be blocked.

The pressure sensor 2300 may induce the high-pressure pump 2200 to be operated more when the pressure of the steam generator 2100 is lower than a reference pressure, and may induce water or steam inside the steam generator 2100 to be discharged when the pressure of the steam generator 2100 is higher than the reference pressure.

For example, the reference pressure may be set to be 1 bar to 3 bar higher than the atmospheric pressure.

The steam generator 2100 may be seated on the base module 3000 and fixed using a fastening member or the like, and the high-pressure pump 2200 may also be seated on the base module 3000.

The heating module 2000 may include a pump connection pipe 2540 that connects the high-pressure pump 2200 with the steam generator 2100. The pump connection pipe 2540 may be made of a flexible material like a rubber hose or the like and may guide high-pressure water into the steam generator 2100.

The high-pressure pump 2200 may include a pump discharge pipe 2210 that receives and discharges water, and a pump supply pipe 2211 that extends from the pump discharge pipe 2210 and supplies water to the pump connection pipe 2540.

The pump supply pipe 2211 may be branched from the pump discharge pipe 2210 so as to effectively transfer water of various pressures or high-pressure water, and the pump connection pipe 2540 may also be formed in a shape of a single pipe at one end, but may be formed as a plurality of branch pipes at the other end so as to be connected to the pump supply pipe 2211.

The water supply structure 2500 may include a water supply connection pipe 2510 that supplies water from the water source to the steam generator 2100 or the high-pressure pump 2200, and a branch supply pipe 2530 that supplies the water from the high-pressure pump 2200 to the steam generator 2100.

In one example, a drainage apparatus 2400 that discharges water inside the steam generator 2100 when the steam generator 2100 stops operating or when steam generated from the steam generator 2100 condenses to generate water may be included.

The drainage apparatus 2400 may be equipped as a pump or as a simple valve. The drainage apparatus 2400 may be disposed under the steam generator 2100 and receive water from a drainage port 2160 of the steam generator 2100.

The drainage structure 2600 may discharge water condensed in the steam generator 2100 or collected in the drainage apparatus 2400.

The drainage structure 2600 may include a drainage connection pipe 2610 extending from the drainage apparatus 2400 to the drainage port 2160, and an inflow pipe 2620 coupled to the drainage connection pipe 2610 to guide water discharged from the drainage apparatus 2400 to the drainage tank 302.

The drainage apparatus 2400 may be connected to both the water supply structure 2500 and the drainage structure 2600. As a result, the structure of supplying or discharging water to or from the steam generator 2100 is unified, simplifying a flow channel and saving space.

In this case, water supplied to an apparatus connection pipe 2520 may be delivered to the drainage apparatus 2400, and the drainage connection pipe 2610 may be in communication with the apparatus connection pipe 2520.

The drainage apparatus 2400 may be controlled to selectively open at least one of the drainage connection pipe 2610 and the apparatus connection pipe 2520. When the drainage apparatus 2400 closes at least one of the drainage connection pipe 2610 and the apparatus connection pipe 2520, water supplied from the pump connection pipe 2540 may be supplied to the steam generator 2100 through the apparatus connection pipe 2520.

When the drainage apparatus 2400 opens both the drainage connection pipe 2610 and the apparatus connection pipe 2520, water collected or condensed in the steam generator 2100 may be completely discharged via the drainage connection pipe 2610. Accordingly, the apparatus connection pipe 2520 may serve as both a flow channel for supplying water to the steam generator 2100 and a flow channel for discharging water from the steam generator 2100.

The drainage apparatus 2400 may be controlled by an independent controller to be described below.

Figure 19:
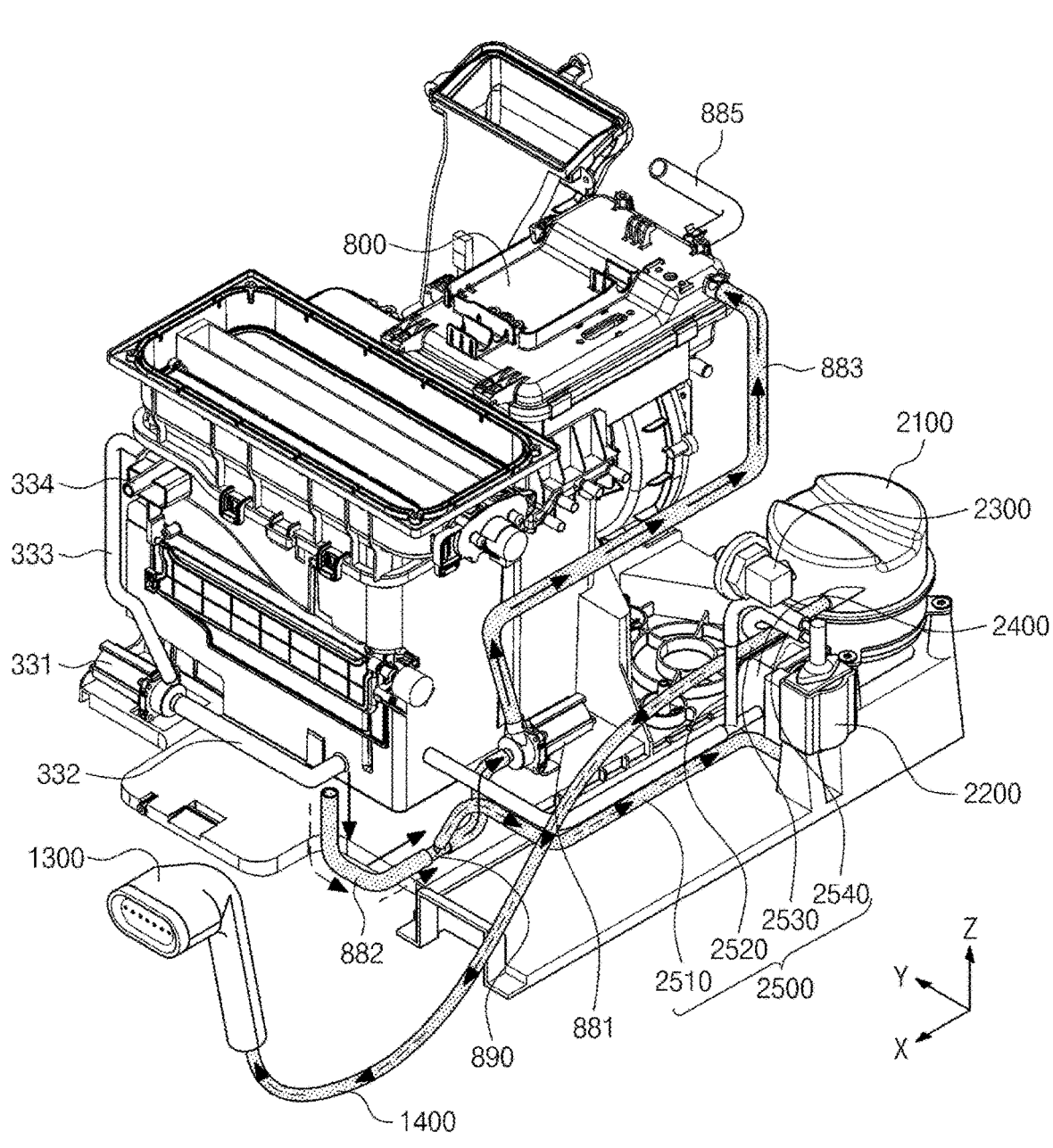
FIG. 19 shows a structure in which the water supply structure and the water supply are in communication with each other.

FIG. 19 shows a structure in which the water supply structure and the water supply are in communication with each other.

The ironing module S may be installed independently of and separately from the structure of the machine room 300, but may be in communication with the water supply 880 disposed in the machine room 300.

As a result, the ironing module S may receive water from the water supply tank 301. Accordingly, the ironing module S being connected to a separate water source or placing an additional water supply tank may be omitted. In addition, the laundry treating apparatus may supply steam to both the inside of the inner casing 200 and the steam iron 1300 via the single water supply tank 301.

In one example, when the steam supply 800 is operated, the steam generator 2100 is controlled not to be operated, and when the steam generator 2100 is operated, the steam supply 800 is controlled not to be operated.

To this end, the laundry treating apparatus of the present disclosure may further include a switching valve 890 that selectively supplies water contained in the water supply tank 301 to the steam supply 800 and the steam generator 2100.

The switching valve 890 may be disposed between the water supply pump 881 and the supply pipe 882 and may be controlled by a main controller 700.

The switching valve 890 may be equipped as a three-way valve.

When at least one of the closing of the door and the operation of the refreshing module T occurs, the switching valve 890 may be controlled to allow the water supply tank 301 and the water supply pump 881 to be in communication with each other and to block the communication between the water supply tank 301 and the water supply structure 2500.

When at least one of the opening of the door and termination of the operation of the refreshing module T occurs, the switching valve 890 may be controlled to block the communication between the water supply tank 301 and the water supply pump 881 and to allow the water supply tank 301 and the water supply structure 2500 to be in communication with each other.

When the switching valve 890 allows the water supply tank 301 and the water supply structure 2500 to be in communication with each other, the water supply connection pipe 2510 may receive water from the water supply tank 301 and transfer water to the high-pressure pump 2200.

The water supply connection pipe 2510 may have one end connected to the water supply 2501 and the other end connected to the high-pressure pump 2200.

In one example, the switching valve 890 may be equipped as a simple T-shaped pipe instead of the valve that changes the flow channel. In this case, when the water supply pump 881 is not operated and only the high-pressure pump 2200 is operated, water in the water supply tank 301 may be introduced into the high-pressure pump 2200 by a negative pressure. Water introduced into the high-pressure pump 2200 may be introduced into the steam generator 2100 via the pump connection pipe 2540 or the like.

In addition, when the water supply pump 881 is operated and the high-pressure pump 2200 is not operated, water in the water supply tank 301 may be supplied to the water supply pump 881 by the negative pressure, flow along the connection pipe 833, and be supplied to the steam supply 800.

Regardless of the configuration of the switching valve 890, when the steam generator 2100 is operated and steam is generated, steam may be transferred to the steam iron 1300 along the cable 1400 and sprayed to the outside of the steam iron 1300.

When the steam nozzle 900 is disposed separately, water supplied via the water supply pump 881 may be supplied to the steam nozzle 900 and then to the steam supply 800.

As a result, the laundry treating apparatus of the present disclosure may supply water contained in the water supply tank 301 to both the steam supply 800 and the steam generator 2100. Therefore, installation of a separate water supply tank for the ironing module S may be omitted.

Figure 20:
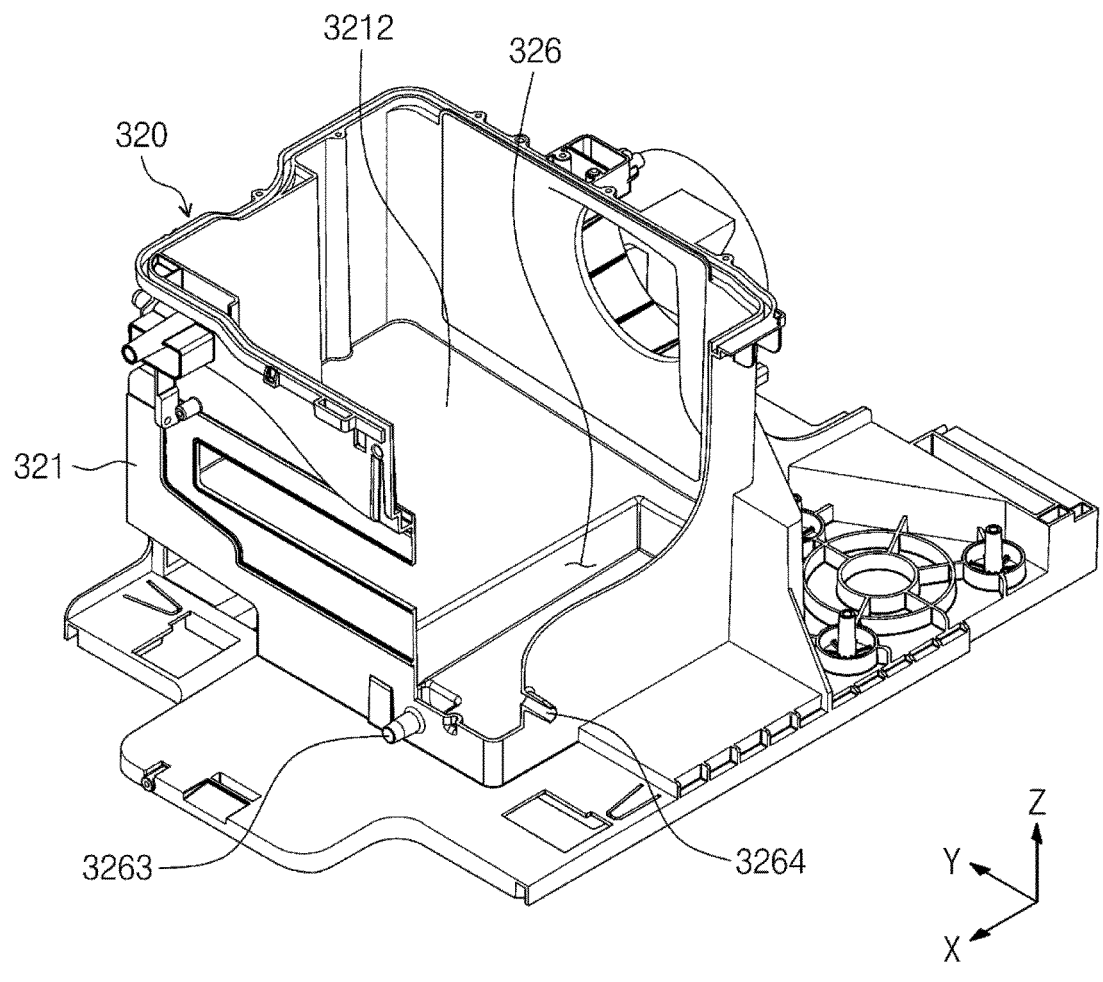
FIG. 20 shows a prerequisite structure in which the drainage structure and the drainage may be in communication with each other.

FIG. 20 shows a prerequisite structure in which the drainage structure and the drainage may be in communication with each other.

The circulation duct 320 may further include an inlet pipe 3264 that guides water discharged from the drainage structure 2600 to the reservoir 326.

A direction in which the inlet pipe 3264 is directed and a direction in which the guide pipe 3263 is directed may be different from each other.

For example, the guide pipe 3263 may be formed on the front surface of the circulation duct 320, and the inlet pipe 3264 may be formed on a left side surface or a right side surface of the circulation duct 320.

The inlet pipe 3264 may be disposed in an area corresponding to a side surface of the reservoir 326 in the side surface of the circulation duct 320.

The inlet pipe 3264 may allow the inside of the reservoir 326 and the outside of the circulation duct 320 to be in communication with each other, and may protrude outward from the side surface of the circulation duct 320.

The inlet pipe 3264 may be installed at a vertical level higher than that of a bottom surface of the reservoir 326 or the guide pipe 3263.

When the drainage structure 2600 discharges water to the inlet pipe 3264, water may be collected in the reservoir 326 and discharged via the guide pipe 3263 to be in communication with the drainage 330.

Therefore, a separate drainage tank for the ironing module S may be omitted.

Figure 21:
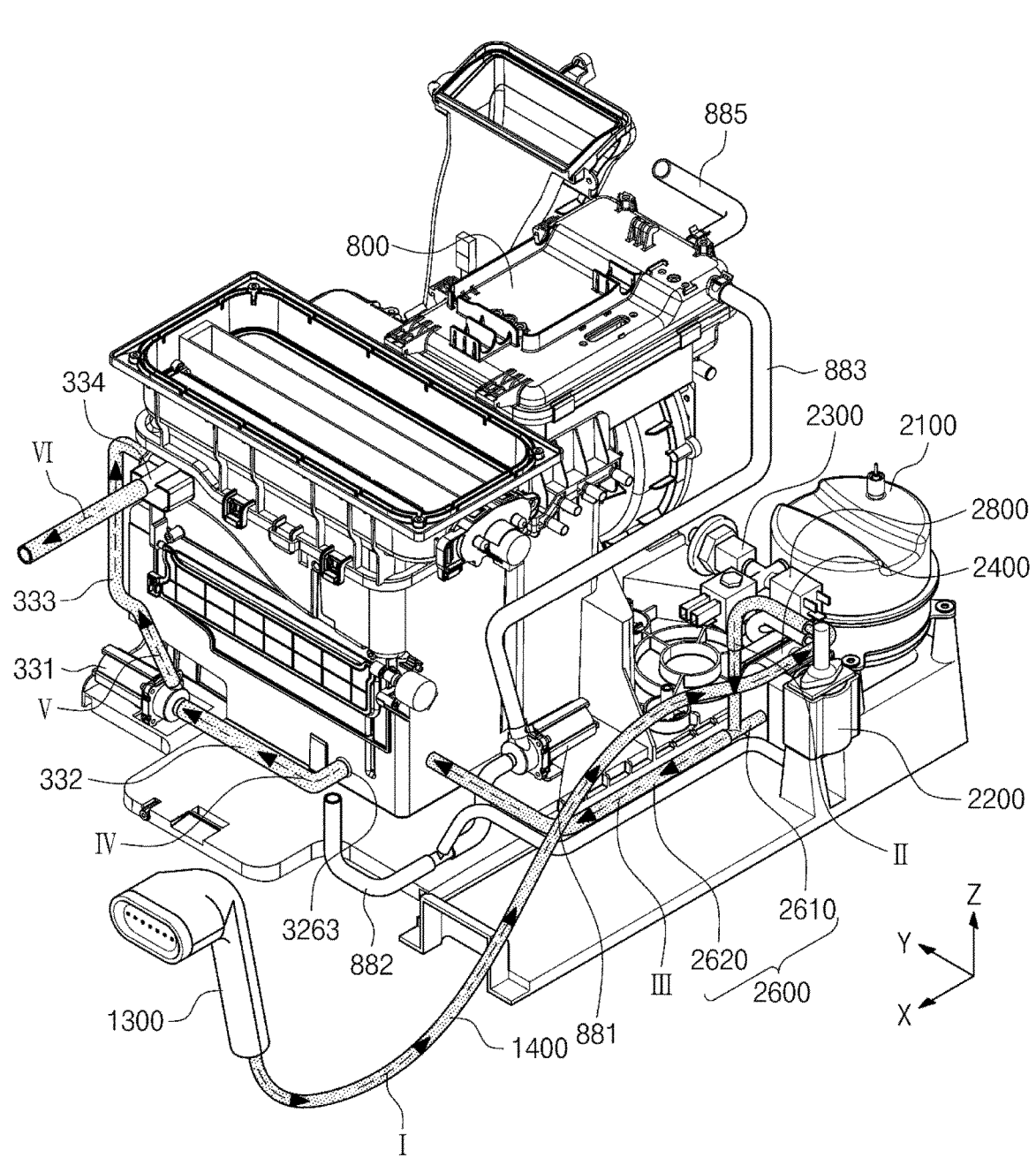
FIG. 21 shows a structure in which the drainage structure and the drainage are in communication with each other.

FIG. 21 shows a structure in which the drainage structure and the drainage are in communication with each other.

The ironing module S may be installed independently of and separately from the structure of the machine room 300, but may be in communication with the drainage 330 of the refreshing module T via the circulation duct 320.

As a result, the ironing module S may discharge residual water into the drainage tank 302. Therefore, a structure in which the ironing module S includes an additional drainage tank 302 or is connected to a separate sewer may be omitted.

The laundry treating apparatus of the present disclosure may collect both residual water collected in the circulation duct 320 and residual water collected in the ironing module S with the single drainage tank 302. The user may discharge both water collected in the circulation duct 320 and the ironing module S by dumping water in the drainage tank 302.

The drainage structure 2600 may be in communication with the drainage 330 via the circulation duct 320.

The drainage structure 2600 may include the drainage connection pipe 2610 connected to the drainage apparatus 2400, and the inflow pipe 2620 connected to the drainage connection pipe 2610 and in communication with the drainage 330. The inflow pipe 2620 may be connected to the inlet pipe 3264.

Water condensed in the steam generator 2100 and residual water may be collected in the drainage apparatus 2400 (direction II). Water condensed in the steam iron 1300 may flow along the cable 1400 and be collected in the drainage apparatus 2400 via the steam generator 2100 (direction I). Water collected in the drainage apparatus 2400 may be connected to the inlet pipe 3264 along the inflow pipe 2620. Water may be collected in the drainage tank 302 (direction III). That is, when the drainage pump 331 is operated, water collected in the drainage apparatus 2400 may be collected in the drainage tank 302 by the negative pressure.

The inflow pipe 2620 may be in communication with the inside of the circulation duct 320.

As a result, all of water collected in the drainage apparatus 2400 may be collected inside the circulation duct 320 and then flow to the drainage pump 331 via the guide pipe 3263. Even when an amount of water collected in the drainage apparatus 2400 is large or an amount of water discharged via the drainage apparatus 2400 is large, water may be collected inside the circulation duct 320, thereby preventing water from overflowing out of the machine room 300.

In one example, the drainage apparatus 2400 may be mounted on the base module 3000 and positioned at a vertical level higher than that of a distal end of the inflow pipe 2620. Accordingly, even when the drainage apparatus 2400 does not generate any special power, water collected in the drainage apparatus 2400 may be collected in the reservoir 326 along the inflow pipe 2620.

When the drainage pump 331 is operated, water collected in the reservoir 326 may be stored in the drainage tank 302.

Figure 22:
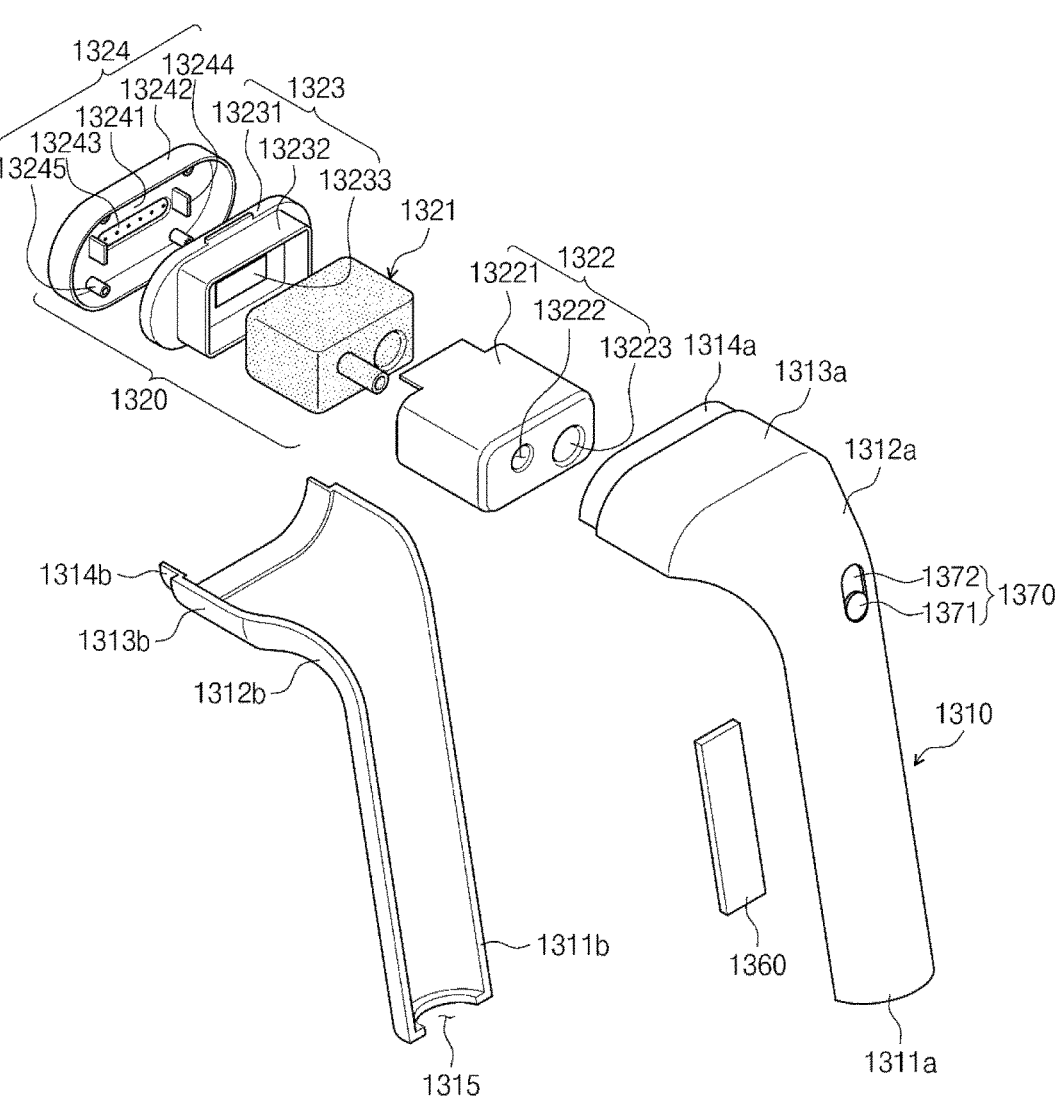
FIG. 22 shows a structure of the steam iron.

FIG. 22 shows a structure of the steam iron.

The steam iron 1300 of the present disclosure may include a gripping portion 1310 connected to the cable 1400 and constructed to be gripped by the user.

The gripping portion 1310 may spray and supply at least one of water and steam to the surface of the laundry.

The gripping portion 1310 may include a handle 1311 that may support a weight of the steam iron 1300, and an extended portion 1313 extended from an upper end of the handle 1311.

The gripping portion 1310 may have an installation space defined therein through which steam may pass and in which various components may be installed, and at least one of steam and heat may be discharged via a distal end of the gripping portion 1310.

The gripping portion 1310 may have a length greater than a width or a thickness, thereby preventing a user's body from being damaged by steam and heat discharged from the distal end of the gripping portion 1310.

The gripping portion 1310 may include the handle 1311 formed in a pipe shape or the like to provide an area that a user's hand may grip, a bent portion 1312 bent from the handle 1311, and the extended portion 1313 that extends from the bent portion 1312 to a distal end.

The handle 1311 may be formed in a cylindrical shape to accommodate the cable 1400 therein and may have a length greater than a diameter. As a result, a space that the user may grip may be secured.

The bent portion 1312 may be bent within 90 degrees at a distal end of the handle 1311. Because of the bent portion 1312, at least one of steam and heat flowing along the handle 1311 may easily encounter the laundry.

The extended portion 1313 may have the greatest cross-sectional area compared to the bent portion 1312 and the handle 1311. As a result, at least one of steam and heat may be induced to be supplied to a wide area.

A space in which a heating apparatus or the like that increases a temperature of supplied steam and heat may be accommodated may be defined in the extended portion 1313.

The gripping portion 1310 may be formed in two pieces to facilitate installation and accommodation of internal components thereof.

For example, the gripping portion 1310 may include a lower gripping portion 1310b that may form a bottom surface and a portion of both side surfaces of the gripping portion 1310, and an upper gripping portion 1310a that may form a top surface and a remaining portion of both side surfaces of the gripping portion 1310.

The gripping portion 1310 may further include a converging portion 1314 that extends further from the extended portion 1313 to the distal end, but has a smaller cross-sectional area than the extended portion 1313. The converging portion 1314 may prevent the internal components of the gripping portion from being arbitrarily discharged to the outside.

The converging portion 1314 may have a hollow defined therein, thereby allowing at least one of steam and heat transferred up to the extended portion 1313 to flow to the outside of the steam iron 1300.

The steam iron 1300 may include a sprayer 1320 that is supported in the gripping portion 1310 and discharges water and steam supplied from the steam generator 2100.

The sprayer 1320 may include a chamber 1321 that is coupled to the cable 1400 to receive and spray water and steam, an insulating accommodating portion 1322 that prevents heat generated in the chamber from being transferred to the gripping portion 1310, a fixing bracket 1323 that is coupled to a front side of the chamber 1321 and prevents the chamber 1321 from being deviated forward of the gripping portion 1310, and a sprayer cover 1324 that is disposed in front of the fixing bracket 1323 and shields the distal end of the gripping portion 1310.

The chamber 1321 may provide a space for storing water and steam transferred from the cable 1400 and may transfer the steam to the outside of the steam iron 1300.

The chamber 1321 may be formed in a casing shape that accommodates steam or water supplied from the steam generator 2100.

As a result, even when steam is condensed into water in the sprayer 1320, water may be reheated and sprayed as steam, and even before steam is condensed into water, steam may be reheated and prevented from being condensed into water.

The sprayer cover 1324 may form a distal end of the steam iron 1300.

The sprayer cover 1324 may include a coupling surface 13241 coupled to the distal end of the gripping portion 1310, an exposed surface 13242 extending from the coupling surface 13241 to form a distal end surface of the steam iron 1300, and a spray hole 13243 extending through the exposed surface 13242 to spray steam to the outside.

The sprayer cover 1324 may include a fixing fastener 13244 that may be fixed by being coupled to the gripping portion 1310 or the internal component thereof, and may include guide ribs 13245 disposed on both sides of the spray hole 13243 to guide the flow of the steam.

The exposed surface 13242 may be formed flat so as to be in contact with the surface of the laundry and may transfer steam and heat generated in the chamber 1321 to the surface of the laundry.

The steam iron 1300 of the present disclosure may further include the fixing bracket 1323 that fixes the chamber 1321 at the distal end of the gripping portion 1310.

The fixing bracket 1323 may include an accommodating circumferential portion 13231 that accommodates therein a front surface of the chamber 1321, a transfer hole 13232 that is defined inside the accommodating circumferential portion and transmits at least one of steam and heat discharged from the chamber 1321 to the sprayer cover 1324, and an expansion body 13233 that expands from the accommodating circumferential portion 13231 and is in contact with the coupling surface.

The steam iron 1300 of the present disclosure may include the insulating accommodating portion 1322 that accommodates the chamber 1321 therein and insulates the chamber 1321.

The insulating accommodating portion 1322 may include an accommodating body 13221 that accommodates the chamber therein, a passage hole 13222 that extends through a rear surface of the accommodating body 13221 and allows steam supplied from the cable 1400 to pass therethrough, and a power hole 13223 through which a power line extended from the cable 1400 passes.

The accommodating body 13221 may accommodate all surfaces except a front surface of the sprayer 1320 therein, and may be made of an insulating material.

As a result, the chamber 1321 may be prevented from being cooled, thereby preventing steam from condensing inside the chamber 1321 or preventing reduction of a thermal efficiency of the steam iron 1300.

The gripping portion 1310 may further include a steamer panel 1360 that may control on/off of the ironing module S and a spray amount of the ironing module S. The steamer panel 1360 may be equipped as a PCB panel.

The steamer panel 1360 may control at least one of the steam generator 2100, the pressure sensor 2300, the temperature sensor 2120, the water supply structure, the drainage structure, and the steam valve 2800, and may perform an arbitrary mode in which the ironing module S supplies steam and heat to the laundry.

The mode may include a first mode that sprays a first amount of steam onto the laundry, a second mode that sprays a second amount of steam greater than the first amount, and a third mode that sprays a third amount of steam greater than the second amount.

In one example, the chamber 1321 of the present disclosure may not only receive and discharge steam, but also reheat water and steam supplied from the cable 1400.

Specifically, the steam generator 2100 heats water to generate and discharges steam.

However, the steam generator 2100 and the steam iron 1300 are spaced apart from each other by a length of the cable 1400, and during the process in which steam passes through the cable 1400, steam is able to at least partially condense into water because of heat exchange with the outside.

In addition, even when the steam generator 2100 generates and discharges high-pressure steam, because the internal pressure of the steam iron 1300 corresponds to the atmospheric pressure, the pressure may decrease during the process of high-pressure steam flowing between the cable 1400 and the steam iron 1300, causing water to condense.

For example, even when steam with a temperature and a pressure respectively corresponding to 150 degrees Celsius and 4 bar is discharged from the steam generator 2100, steam may be changed into steam with a temperature and a pressure of 100 degrees Celsius and 1 atm while being transmitted to the cable 1400 and the steam iron 1300, and further may be changed into condensate with a temperature equal to or lower than 100 degrees Celsius.

In addition, even when only steam is normally supplied up to the steam iron 1300, steam may be condensed into water while passing through the gripping portion 1310 and the sprayer 1320 of the steam iron 1300.

In this case, water may be discharged from the steam iron 1300, causing the laundry to become wet.

To prevent such problem, the ironing module S of the present disclosure may reheat at least one of water and steam transmitted via the cable 1400 inside the steam iron 1300.

Because the gripping portion 1310 is a portion that comes into contact with the user's body, the ironing module S of the present disclosure may be constructed such that the sprayer 1320 is heated to reheat at least one of water and steam supplied from the cable 1400.

As a result, even when water is supplied from the cable 1400 or steam is partially condensed while passing through the sprayer 1320, water or steam may be reheated in the sprayer 1320 and entirely sprayed out of the steam iron 1300 in a steam state.

In addition, the steam iron 1300 of the present disclosure may have a separate space for collecting condensate inside. Therefore, even when water condenses inside the steam iron 1300 or condensed water is delivered to the steam iron 1300, water may be prevented from being discharged as it is to the outside of the steam iron 1300.

Additionally, the steam iron 1300 of the present disclosure may reheat the collected water in the sprayer 1320 to regenerate steam and then discharge steam.

In the steam iron 1300 of the present disclosure, at least some components of the sprayer 1320 may reheat water and steam.

For example, because the chamber 1321 is a component that is in direct communication with the cable 1400, the chamber 1321 may be able to heat water and steam. In addition, all other components of the sprayer 1320 may be made of an insulating material or a material having a high specific heat, so that the user may be prevented from being burned by the chamber 1321 or water may be prevented from condensing inside the chamber 1321.

The gripping portion 1310 may be equipped with an operation input unit 1370 that receives a command to control the ironing module S.

The operation input unit 1370 may include a power unit 1371 that determines on/off of the chamber 1321 and the steam generator 2100, and a selection unit 1372 that selects an arbitrary mode that may adjust a heating intensity of the chamber 1321 and the steam generator 2100 to adjust the spray amount of the ironing module S.

The power unit 1371 and the selection unit 1372 may be equipped as any component as long as they are able to receive an input of the user, such as a button type, a slide type, or a touch type.

Figure 23:
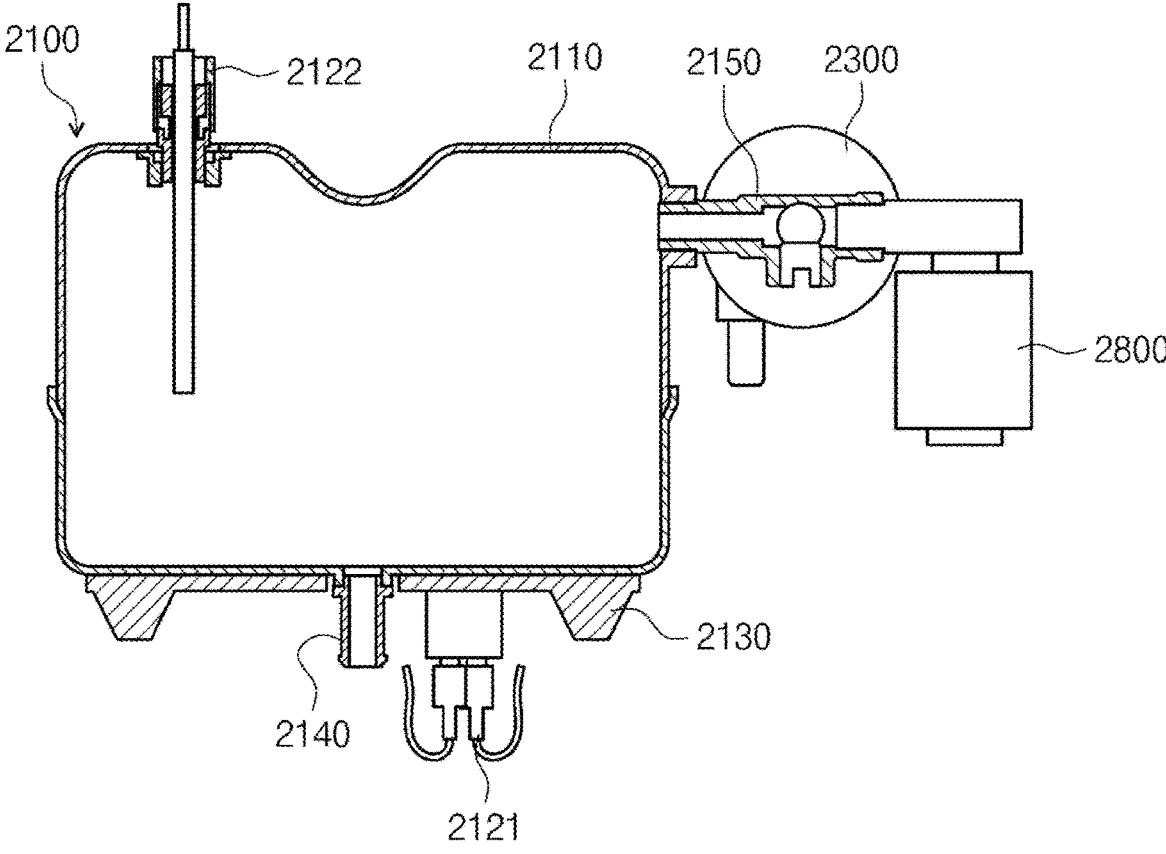
FIG. 23 shows a cross-section of a steam generator of the present disclosure.

FIG. 23 shows a cross-section of a steam generator of the present disclosure.

The steam generator 2100 of the present disclosure may heat water to generate steam and supply steam to the steam iron 1300.

However, when the steam generator 2100 and the steam iron 1300 are disposed to be spaced apart from each other and connected to each other via the cable 1400, a power to transmit steam generated from the steam generator 2100 to the steam iron 1300 may decrease, or steam may condense while passing through the cable 1400 and thus a sufficient amount of steam may not be supplied up to the steam iron 1300.

In other words, even when the steam generator 2100 generates a sufficient amount of steam and supplies the same to the steam iron 1300, a small amount of steam or water may be discharged via the sprayer 1320 of the steam iron 1300.

Therefore, the ironing module S of the present disclosure may be constructed such that the steam generator 2100 generates and discharges steam having a pressure higher than the atmospheric pressure. In the steam generator 2100, because the sprayer 1320 of the steam iron 1300 is in the atmospheric pressure state, high-pressure steam having the pressure higher than the atmospheric pressure may pass through the cable 1400 and be discharged as is to the sprayer 1320 because of a pressure difference.

In addition, even when high-pressure steam generated in the steam generator 2100 is cooled to a certain level and is subjected to a pressure drop by exchanging heat with the surroundings during the process of passing through the cable 1400 or passing through the steam iron 1300 and being discharged, when the pressure of high-pressure steam is higher than the atmospheric pressure, high-pressure steam may not be cooled to a temperature lower than 100 degrees Celsius or may be maintained in a state of not being condensed into water even when it is cooled. As a result, steam generated in the steam generator 2100 may be discharged to the outside of the sprayer 1320 without a problem.

To this end, the steam generator 2100 may not discharge steam generated by heating water inside the steam body 2110 to the exit 2150 as it is, but may continuously heat the steam by locking the exit 2150 with the steam valve 2800. As a result, the steam generator 2100 may further heat the steam and water to increase the pressure of the steam to be higher than the atmospheric pressure.

Even when steam is generated inside the steam body 2110 and a water level inside the steam body 2110 decreases, the steam body 2110 needs to be continuously heated.

Therefore, the heater 2130 may not be disposed to be submerged in stored water inside the steam body 2110, but may be attached to a surface of the steam body 2110 to heat the steam body 2110 itself. As a result, the heater 2130 may heat the steam body 2110 regardless of the water level inside the steam body 2110, and even when only steam is contained inside the steam body 2110, may continuously heat the steam body 2110 to increase a pressure of steam contained in the steam body 2110.

As a result, the steam generator 2100 may generate steam with the pressure higher than the atmospheric pressure by heating water contained therein, in the same manner as a pressure cooker.

The heater 2130 may be attached to a bottom surface of the steam body 2110. As a result, heat may be directly transferred to water contained in the steam body 2110 to generate steam more quickly.

The steam generator 2100 may further include a thermostat 2121 that senses a temperature of the heater 2130. The thermostat 2121 may cut off power supplied to the heater 2130 when the heater 2130 is heated to a temperature equal to or higher than a limit temperature, or may control ON/OFF of the heater 2130.

In one example, even when it is high-pressure steam, the temperature, the pressure, and the spray amount of steam sprayed from the steam iron 1300 need to be precisely controlled to protect the laundry. However, in a pressure range higher than the atmospheric pressure, it may be difficult to precisely measure the pressure of steam generated from the steam generator 2100, and it may also be difficult for the steam valve 2800 to open the exit 2150 at a precise time point.

Therefore, the ironing module S of the present disclosure may be equipped with the pressure sensor 2300 as a pressure switch that senses a set pressure so as to precisely control the pressure and the spray amount of steam even under high-pressure conditions.

That is, the pressure switch may be in a structure that may immediately react when a pressure of the exit 2150 reaches a set specific pressure. A pressure switch disclosed in the prior art may be used as it is as such pressure switch.

When the pressure switch senses the specific pressure, the steam valve 2800 may be controlled to immediately open the exit 2150. Therefore, whenever the steam generator 2100 operates, steam of the specific pressure may be uniformly discharged.

In one example, a temperature of steam with the specific pressure is determined based on properties of water, and a total amount (the spray amount) of steam at the exit 2150 having the same cross-sectional area is determined.

Therefore, the ironing module S of the present disclosure may spray steam having the specific pressure, temperature, and spray amount when the pressure switch is set to respond to the specific pressure.

However, when the spray of the steam is determined by the pressure switch, the ironing module S of the present disclosure has a limitation of spraying only one type of steam, which is not suitable for treating various laundry.

For example, in the case of laundry with general fabrics such as cotton and towels, the damage to the laundry is small even when the spray amount of steam is great or the temperature of steam is high, but in the case of laundry with fabrics vulnerable to moisture and temperature such as silk and cashmere, the spray amount and the temperature of steam should be set low. In addition, in the case of laundry with thick fabrics such as jeans, coats, and blankets, a large amount of steam should be supplied to remove the wrinkles.

To this end, when the pressure switches with various pressure conditions are installed in the steam generator 2100, a plurality of exits 2150 should be installed to correspond to the pressure switches, and a plurality of cables 1400 and a plurality of steam valves 2800 should also be installed, which causes inconvenience.

To solve such problem, the ironing module S of the present disclosure may control the opening and closing of the steam valve 2800 by also using the temperature sensor 2120 that senses a temperature of the steam generator 2100. Specifically, when a temperature of steam in a saturated state is determined, a pressure of the corresponding steam is also determined. Therefore, when a temperature in a pressure range different from the specific pressure sensed by the pressure switch is identified via the temperature sensor, the steam generator 2100 may discharge steam with a pressure and a temperature different from the specific pressure and the temperature corresponding thereto.

As a result, the ironing module S of the present disclosure may accurately spray steam with two or more pressures, temperatures, and spray amounts using both the pressure switch 2300 and the temperature sensor 2120.

The temperature sensor 2120 may include at least one of a thermometer 2122 inserted into the steam generator 2100 to sense the temperature of steam in the saturated state and the thermostat 2121. The thermometer 2122 and the thermostat 2121 may both be disposed, or only one of them may be disposed.

In the ironing module S of the present disclosure, the steamer panel 1360 may perform the role of the controller, and a control panel seated adjacent to the steam generator 2100 may also perform the role of the controller.

The controller may control the heater 2130, the steam valve 2800, the temperature sensor 2120, and the steam iron 1300.

The controller may control the steam valve 2800 to open when a temperature of at least one of the thermometer 2122 and the thermostat 2121 reaches a set temperature.

In one example, the heater 2130 is not a component that is always immersed in water. Even when the heater 2130 is disposed inside the steam generator 2100, at least a partial area thereof is exposed to steam when water is almost evaporated into steam, and when the heater 2130 is disposed outside the steam generator 2100, the heater 2130 is directly exposed to air. Therefore, the heater 2130 has a limitation in that a temperature deviation increases when the temperature thereof increases and thus precise temperature control thereof is not available.

Therefore, the ironing module S of the present disclosure may control the steam valve 2800 to open using the pressure switch 2300 when spraying high-temperature and high-pressure steam, and control the steam valve 2800 to open using the temperature sensor 2120 when spraying relatively low-temperature and low-pressure steam.

As a result, the ironing module S of the present disclosure may control spray of a large amount of high-temperature and high-pressure steam or spray of a relatively small amount of low-temperature and low-pressure steam using only the single pressure switch 2300.

In one example, the heater 2130 may measure or control the temperature relatively precisely even when exposed to air or steam at a temperature equal to or lower than a reference temperature.

For reference, the reference temperature may be usually set to 140 degrees Celsius, and it is known that accuracy of sensing the temperature of the heater 2130 or the temperature of steam via the temperature sensor 2120 decreases exponentially at a temperature equal to or higher than 140 degrees Celsius.

Therefore, when the temperature of the heater 2130 or the steam generator 2100 of the present disclosure is equal to or lower than the reference temperature, the temperature sensor 2120 may accurately sense a plurality of temperature ranges. Therefore, when at least one set temperature is reached in a temperature condition equal to or lower than the reference temperature, the steam valve 2800 may be controlled to open even when the pressure switch does not respond to the specific pressure.

When there are two set temperatures lower than the reference temperature, the ironing module S of the present disclosure may be controlled to spray a total of three types of steam having different temperatures, pressures, and spray amounts.

In addition, when there are n set temperatures lower than the reference temperature, the ironing module S of the present disclosure may be controlled to spray a total of n+1 types of steam having different temperatures, pressures, and spray amounts. The n types of steam are all steam having temperatures lower than the reference temperature and having relatively small spray amounts, and one type of steam corresponds to steam having a temperature higher than the reference temperature, the specific pressure, and a relatively large spray amount.

In one example, the higher the specific pressure, the higher the temperature, pressure, spray amount of steam will be, but it is preferable that the specific pressure has a limit by comprehensively considering stability, a maximum required spray amount, and the like. However, in any case, steam of the specific pressure will correspond to steam having a temperature higher than the reference temperature.

In summary, it may be seen that the ironing module S of the present disclosure is controlled to open when the temperature of the steam generator reaches the set temperature until the steam generator 2100 reaches the reference temperature, and to open when the steam generator reaches the specific pressure after the reference temperature.

For example, the reference temperature may correspond to 140 degrees, and the specific pressure may correspond to 4 bar.

Because the steam valve 2800 is controlled only by the pressure switch at the temperature equal to or higher than the reference temperature, the steam valve 2800 may be controlled to open only when the specific pressure is reached.

In one example, the set temperature should correspond to at least a temperature at which steam should be generated, and should be a temperature that may remove basic wrinkles from the laundry.

In addition, the specific pressure should correspond to at least a pressure that may ensure stability, and should be lower than a pressure corresponding to a spray amount that wets the laundry.

Accordingly, the ironing module S of the present disclosure may be operated in a minimum mode or a first mode in which the heater 2130 or the steam generator 2100 is heated to an initial temperature at which the heater 2130 or the steam generator 2100 generates steam under a minimum temperature condition and maintains the initial temperature, and a maximum mode or a third mode in which the heater 2130 or the steam generator 2100 is heated to a maximum temperature at which the heater 2130 or the steam generator 2100 generates steam under a maximum pressure condition and maintains the maximum temperature.

The initial temperature may be a temperature lower than the reference temperature.

When controlled under the minimum mode or the first mode, a minimum spray amount or a first spray amount of steam is generated and sprayed from the steam generator 2100, and when controlled under the maximum mode or the third mode, a maximum spray amount or a third spray amount of steam is generated and sprayed from the steam generator 2100.

In addition, the ironing module S of the present disclosure may be operated in an intermediate mode or a second mode in which the heater 2130 or the steam generator 2100 is heated to at least one intermediate temperature, which is higher than the initial temperature at which the heater 2130 or the steam generator 2100 generates steam under the minimum temperature condition and lower than the maximum temperature at which the heater 2130 or the steam generator 2100 generates steam under the maximum temperature condition, and the at least one intermediate temperature is maintained.

The intermediate temperature may be set to be equal to or lower than the reference temperature.

That is, the steam valve 2800 may be controlled to open when the steam generator 2100 reaches the initial temperature at the temperature equal to or lower than the reference temperature. In addition, the steam generator 2100 may be controlled to open each time it reaches at least one intermediate temperature that is higher than the initial temperature and lower than the reference temperature.

A following description assumes that the second mode corresponds to one temperature range, but the second mode may have N temperature ranges as long as they are temperature ranges higher than the initial temperature and lower than the reference temperature.

A selection command of selecting whether to operate the ironing module S in the minimum/intermediate/maximum mode may be input via the input unit of the selection unit 1372 equipped in the steam iron 1300.

When one of the minimum/intermediate/maximum modes is determined, the controller will operate the heater 2130 with the corresponding temperature condition, and will operate the heater 2130 such that the corresponding temperature condition is maintained. In addition, the controller will open the steam valve 2800 under the corresponding temperature condition.

The spray amount of steam generated by the steam generator 2100 in the minimum mode is smaller than the spray amount of steam generated by the steam generator 2100 in the maximum mode.

In addition, the spray amount of steam generated by the steam generator 2100 in the intermediate mode is smaller than that in the maximum mode and greater than that in the minimum mode.

Figure 24:
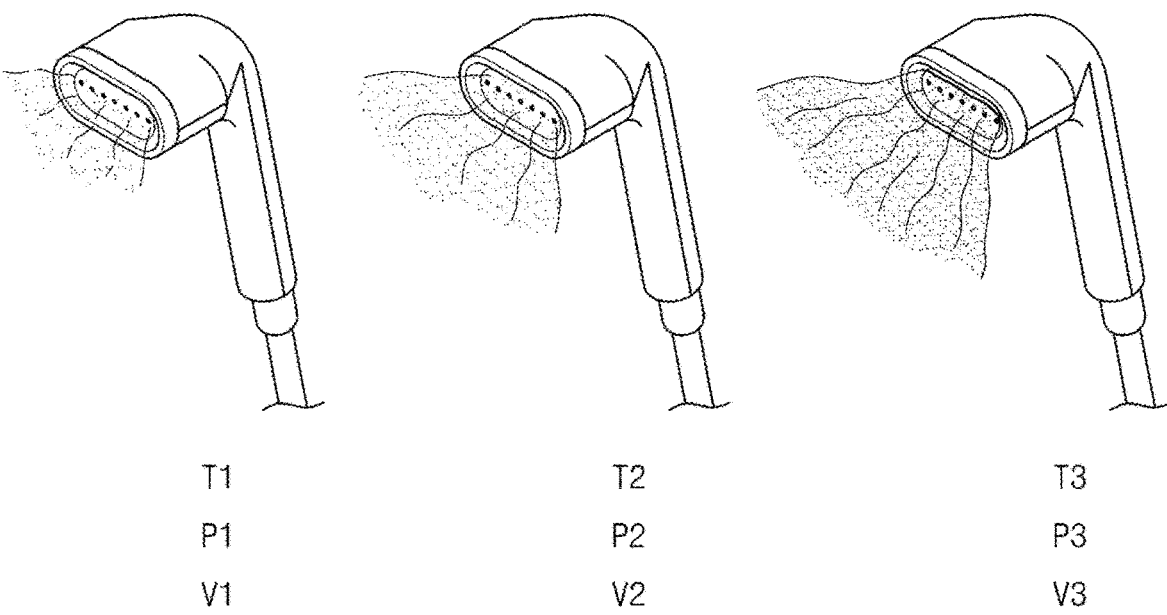
FIG. 24 shows a steam iron spraying steam by precisely controlling an amount of steam.

FIG. 24 shows a steam iron spraying steam by precisely controlling an amount of steam.

Referring to (a) in FIG. 24, conditions of steam generated by the steam generator 2100 in the minimum mode should be clearly set so as not to damage delicate laundry such as silk and cashmere while removing the wrinkles from the laundry. Based on the standard steam amount measurement method (1EC60311), a steam amount V1 in the minimum mode may be set to 45 cc per minute, with a tolerance of +10 cc to −10 cc.

In the minimum mode, an initial temperature T1 may be set to be in a range of 130 to 135 degrees Celsius, and an initial pressure P1 of steam in the saturated state at the corresponding temperature may be approximately 2 bar. In other words, in the minimum mode, the temperature T1 of sprayed steam may be set to be in the range of 130 to 135 degrees Celsius, the pressure P1 of steam may be approximately 2 bar, and the spray amount V1 thereof may be set to be in a range of 35 to 55 cc per minute.

As a result, while preserving the delicate laundry such as silk and cashmere, the wrinkles of the laundry may be removed or the laundry may be deodorized.

The standard steam amount measurement method corresponds to measuring the spray amount of steam as an amount of steam emitted when the steam valve 2800 repeats a process of opening the exit 2150 for 5 seconds and closing the exit 2150 for 15 seconds 12 times. This is a standard measurement method that is also generally used by other manufacturers around the world, and enables physical measurements under any conditions.

In addition, based on the standard steam amount measurement method (1EC60311), a maximum steam amount V3 in the maximum mode may be set to 75 cc per minute, with a tolerance of +10 cc to −10 cc.

In addition, based on the standard steam amount measurement method (1EC60311), an intermediate steam amount V2 in the intermediate mode may be set to 55 cc per minute, with a tolerance of +10 cc to −10 cc.

In addition, in the intermediate mode, an intermediate temperature T2 may be set to be in a range of 135 to 140 degrees Celsius, and an intermediate pressure P2 of steam in the saturated state at the corresponding temperature may be approximately 3 bar. In other words, in the intermediate mode, the intermediate temperature T2 of sprayed steam may be set to be in the range of 135 to 140 degrees Celsius, the intermediate pressure P2 of steam may be approximately 3 bar, and the intermediate spray amount V2 thereof may be set to be in a range of 45 cc to 65 cc per minute.

As a result, with the most optimal amounts of energy and steam, wrinkle removal or deodorization of the most commonly used laundry may be performed.

In addition, as may be seen from the minimum mode and the intermediate mode, the temperature condition of the steam may be precisely controlled within a range of 5 degrees.

In the maximum mode, a maximum pressure P3 may correspond to 4 bar. In other words, the pressure of steam in the maximum mode may be set to 4 bar, a maximum temperature T3 of steam may correspond to a temperature when steam is in the saturated state with the pressure of 4 bar, and a maximum spray amount V3 thereof may be set to be in a range of 65 cc to 85 cc per minute.

As a result, even for the thickest laundry, the wrinkles of the laundry may be effectively removed and the laundry may be deodorized while keeping the laundry dry.

In summary, it may be seen that the steam valve 2800 is controlled to open when the temperature of the steam generator 2100 reaches the set temperature until the steam generator 2100 reaches the reference temperature, and to open when the steam generator 2100 reaches the specific pressure.

In addition, it may be seen that optimal operating conditions of the ironing module S of the present disclosure are that the spray amount of steam is set to be equal to or smaller than 65 cc per minute until the steam generator 2100 reaches the reference temperature or is maintained at a temperature equal to or lower than the reference temperature, and the spray amount of steam is set to be in a range of 65 cc to 85 cc per minute when the steam generator 2100 reaches the specific pressure.

The present disclosure may be modified and implemented in various forms, so that the scope of rights thereof is not limited to the above-described embodiments. Therefore, when the modified embodiment includes elements of the claims of the present disclosure, it should be considered to fall within the scope of the present disclosure.

What is claimed is:

1. An ironing module comprising:

a water supply tank configured to store water therein;

a steam generator configured to receive the water from the water supply tank and heat the water;

a temperature sensor configured to sense a temperature of the steam generator;

a pressure sensor configured to sense a pressure of the steam generator;

a cable configured to discharge steam heated by the steam generator;

a steam iron connected to a distal end of the cable and configured to spray steam to an outside of the steam iron;

a valve coupled to the steam generator and configured to open and close the cable; and a controller configured to control the valve to open the cable in a minimum mode and in a maximum mode, wherein the controller is configured to:

based on a temperature of the steam generator reaching a first temperature that is less than a reference temperature in the minimum mode, control the valve to open the cable, and based on a pressure inside the steam generator reaching a predetermined pressure while the temperature of the steam generator is greater than the reference temperature in the maximum mode, control the valve to open the cable.

2. The ironing module of claim 1, further comprising a heater coupled to an outer side of the steam generator and configured to heat the steam generator and generate steam.

3. The ironing module of claim 2, wherein, the controller is configured to, in the maximum mode, control the valve to open the cable only based on the pressure inside the steam generator reaching the predetermined pressure.

4. The ironing module of claim 3, wherein the pressure sensor is provided as a pressure switch configured to sense whether the pressure inside the steam generator reaches the predetermined pressure.

5. The ironing module of claim 4, wherein the pressure switch is provided as a single pressure switch disposed on the valve, the cable, or the steam generator.

6. The ironing module of claim 4, wherein the controller is configured to control the valve to open the cable in an intermediate mode, and wherein, in the intermediate mode, the controller is configured to control the valve to open the cable based on a temperature of the steam generator reaching a second temperature that is greater than the first temperature and less than the reference temperature.

7. The ironing module of claim 6, wherein, in the intermediate mode, the heater is configured to heat the steam generator until the temperature of the steam generator reaches the second temperature and maintains the second temperature.

8. The ironing module of claim 7, wherein a spray amount of steam supplied from the steam generator to the cable is set to be greater in the intermediate mode than in the minimum mode, and is set to be greater in the maximum mode than in the intermediate mode.

9. The ironing module of claim 2, wherein the heater is configured to:

heat the steam generator until the temperature of the steam generator reaches the first temperature and maintains the first temperature in the minimum mode; and heat the steam generator until the pressure of the steam generator reaches the predetermined pressure and maintains the predetermined pressure in the maximum mode.

10. An ironing module comprising:

a water supply tank configured to store water therein;

a steam generator configured to receive the water from the water supply tank and heat the water;

a cable configured to discharge steam heated by the steam generator; and a steam iron connected to a distal end of the cable to spray steam to an outside of the steam iron, wherein the steam generator includes:

a steam body providing a storage space for storing water therein;

a steam heater configured to heat the steam body or the water;

an entrance disposed on the steam body and configured to guide the water to the storage space;

an exit that extends from the steam body and configured to discharge steam to the cable;

a valve coupled to the exit and configured to open and close the exit;

a temperature sensor configured to sense a temperature of the steam body or the storage space; and a pressure sensor configured to sense a pressure of the storage space or the exit, wherein the ironing module further comprises a controller configured to control the valve and the steam heater, and wherein the controller is configured to:

control the valve to allow the steam to be sprayed at a first temperature that is less than 140 degrees Celsius or at a second temperature greater than 140 degrees Celsius, and based on the pressure sensor detecting a pressure greater than or equal to 3 bar, open the valve and allow the steam to be sprayed at the second temperature.

11. The ironing module of claim 10, wherein the controller is configured to, based on the steam at the second temperature being sprayed, control the valve and the steam heater to maintain a pressure of the sprayed steam.

* * * * *